US 8,337,346 B2

(12) United States Patent
Kochidomari et al.

(10) Patent No.: US 8,337,346 B2
(45) Date of Patent: Dec. 25, 2012

(54) POWER UNIT

(75) Inventors: Yoshitaka Kochidomari, Amagasaki (JP); Shuji Nishimoto, Amagasaki (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 564 days.

(21) Appl. No.: 12/616,407

(22) Filed: Nov. 11, 2009

(65) Prior Publication Data
US 2010/0120565 A1    May 13, 2010

(30) Foreign Application Priority Data

Nov. 11, 2008  (JP) .................................. 2008-289065

(51) Int. Cl.
*B62J 13/00*  (2006.01)
(52) U.S. Cl. .................. 474/144; 474/150; 180/366
(58) Field of Classification Search .............. 474/144, 474/150; 180/233, 366
See application file for complete search history.

(56) References Cited

U.S. PATENT DOCUMENTS

| 4,493,677 | A | * | 1/1985 | Ikenoya ........................... 474/93 |
| 5,046,576 | A | * | 9/1991 | Miyawaki ....................... 180/233 |
| 6,267,700 | B1 | * | 7/2001 | Takayama ........................ 474/93 |
| 6,338,688 | B1 | * | 1/2002 | Minami et al. ................. 474/144 |
| 6,964,310 | B2 | * | 11/2005 | Hasegawa .................. 180/24.09 |
| 7,377,351 | B2 | | 5/2008 | Smith et al. |
| 7,686,123 | B2 | * | 3/2010 | Ishida ........................... 180/346 |

FOREIGN PATENT DOCUMENTS

| JP | H02-200526 A | 8/1990 |
| JP | H10-297295 A | 11/1998 |

* cited by examiner

*Primary Examiner* — Sang Kim
(74) *Attorney, Agent, or Firm* — Sterne, Kessler, Goldstein & Fox, P.L.L.C.

(57) ABSTRACT

A power unit may include an engine, a belt transmission driven by the engine, a belt transmission chamber incorporating the belt transmission, a second transmission driven by the belt transmission, a second transmission chamber incorporating the second transmission, and a housing member constituting both a part of the belt transmission chamber and a part of the second transmission chamber.

6 Claims, 22 Drawing Sheets

(b)

(a)

POWER UNIT

BACKGROUND OF THE INVENTION

1. Field of the Invention

The present invention relates to a power unit including an engine, a belt transmission driven by the engine, and a second transmission, such as a gear transmission, driven by the belt transmission, wherein the power unit is adaptable to a vehicle, especially, a multi-wheel drive vehicle such as a four-wheel drive vehicle.

2. Related Art

As disclosed in each of JP H02-200526A, JP H10-297295A and U.S. Pat. No. 7,377,351, a typical conventional power unit for a multi-wheel drive vehicle, such as a four-wheel drive utility vehicle, includes an engine, a belt transmission driven by the engine, and a second transmission having first and second output portions for respective front and rear wheel axles and driven by the belt transmission. In this power unit, an engine output shaft of the engine has a horizontal axis in a fore-and-aft direction of a vehicle. The second transmission is disposed on one of the right and left sides of the engine. Transmission shafts of the second transmission have respective horizontal axes in the fore-and-aft direction of the vehicle.

One of the transmission shafts of the second transmission is a transmission input shaft serving as an input shaft of the transmission shafts. The engine output shaft and the transmission input shaft have end portions projecting forward or rearward from the engine and the second transmission in the vehicle. The belt transmission is disposed on one of the front and rear sides of the engine and the second transmission so as to drivingly connect the end portions of the engine output shaft and the transmission input shaft to each other.

More specifically, in the belt transmission disposed on the front or rear side of the engine and the second transmission, a drive pulley is provided on the end portion of the engine output shaft, a driven pulley is provided on the end portion of the transmission input shaft, and a belt is looped over the drive and driven pulleys.

In the typical conventional power unit, a belt transmission casing is provided therein with a belt transmission chamber incorporating the belt transmission, including the drive and driven pulley and the belt. A second transmission casing separated from the belt transmission casing is provided therein with a second transmission chamber incorporating the second transmission. The end portion of the transmission input shaft to be drivingly connected to the belt transmission is extended outward from the second transmission casing and into the belt transmission chamber of the belt transmission casing.

Generally, the belt transmission casing is constituted by joining divisional casing members for convenient maintenance of the belt transmission in the belt transmission chamber. In this regard, for maintenance of the belt transmission, one divisional casing member can be separated from another divisional casing member so as to easily expose the belt transmission.

SUMMARY OF THE INVENTION

In the typical conventional power unit, the belt transmission casing, even if being dividable into divisional casing members, is separated from the second transmission casing. To assemble the power unit, the belt transmission casing has to be attached to the second transmission casing, thereby increasing the number of components and the number of processes for assembling components of the power unit. Further, a joint section where the belt transmission casing is joined to the second transmission casing is liable to leak lubricating fluid from the second transmission chamber into the belt transmission chamber. On an assumption that the second transmission is a gear transmission, this lubricating fluid includes metal powder generated by rubbing of gears of the second transmission, thereby damaging the belt transmission in the belt transmission chamber if it leaks into the belt transmission chamber.

A first object of the invention is to provide a power unit comprising an engine, a belt transmission driven by the engine, and a second transmission driven by the belt transmission, wherein the number of components to be assembled and the number of processes for assembling the components are reduced so that the engine, the belt transmission and the second transmission can be easily assembled together.

A second object of the invention is to provide the power unit protecting the belt transmission from leaking lubricating fluid from the second transmission chamber.

A power unit according to the invention includes an engine, a belt transmission driven by the engine, a belt transmission chamber incorporating the belt transmission, a second transmission driven by the belt transmission, a second transmission chamber incorporating the second transmission, and a housing member constituting both a part of the belt transmission chamber and a part of the second transmission chamber.

Therefore, the housing member serves as both a casing constituting the part of the belt transmission chamber and another casing constituting part of the second transmission chamber, thereby achieving the first object, that is, thereby reducing the number of casings to be joined to each other, and thereby reducing the number of processes for assembling components of the power unit.

In a first aspect of the power unit, the engine is attached to the housing member so as to be drivingly connected to the belt transmission in the belt transmission chamber.

Therefore, the engine can be easily assembled with the belt transmission and the second transmission, thereby easily producing the power unit.

In a second aspect of the power unit, the second transmission includes a transmission input shaft and a transmission output shaft. The housing member includes a partition wall between the part of the belt transmission chamber and the part of the second transmission chamber. The transmission input shaft is extended into the belt transmission chamber through the partition wall of the housing member so as to be drivingly connected to the belt transmission. The transmission output shaft is extended through the partition wall of the housing member and the belt transmission chamber and is extended outward from the belt transmission chamber opposite to the second transmission chamber.

Therefore, the transmission output shaft, viewed in the axial direction thereof, is overlapped with the belt transmission chamber rather than offset from the belt transmission chamber, thereby eliminating a gap between the transmission output shaft and the belt transmission chamber and thereby minimizing the power unit.

In a third aspect, the belt transmission includes a drive pulley, driven pulley, and a belt looped over the drive and driven pulleys. The belt has first and second portions extended between the drive and driven pulleys, the first portion running from the drive pulley to the driven pulley, and the second portion running from the driven pulley to the drive pulley. A portion of the transmission output shaft extended through the belt transmission chamber is disposed between the drive and driven pulleys and between the first and second portions of the belt.

Therefore, the transmission output shaft, viewed in the axial direction thereof, is overlapped with the belt transmission rather than offset from the belt transmission, thereby eliminating a gap between the transmission output shaft and the belt transmission and thereby further minimizing the power unit.

In a fourth aspect of the power unit, the transmission input shaft and the transmission output shaft are provided thereon with respective fluid-seals in the partition wall of the housing member.

Therefore, the fluid-seals prevent lubricating fluid from leaking along the transmission input and output shafts through the partition wall from the second transmission chamber into the belt transmission chamber, thereby achieving the second object.

In a fifth aspect of the power unit, the power unit further comprises a belt transmission casing joined to the housing member so as to constitute the belt transmission chamber. The transmission output shaft penetrates the belt transmission casing so as to be extended outward from the belt transmission chamber.

Therefore, if the belt transmission casing is separably joined to the housing member, the belt transmission can be easily exposed for convenient maintenance of it by separating the belt transmission casing from the housing member.

In a sixth aspect of the power unit, the transmission output shaft is provided thereon with a fluid-seal in a wall of the belt transmission casing.

Therefore, the fluid-seal prevents impurities existing outside of the belt transmission chamber from entering the belt transmission chamber through a gap between the transmission output shaft and the wall of the belt transmission casing, thereby protecting the belt transmission from the impurities.

In a seventh aspect of the power unit, a portion of the transmission output shaft penetrating the belt transmission casing is separable from a portion of the transmission output shaft supported by the partition wall of the housing member in the belt transmission chamber.

Therefore, when the belt transmission casing is separated from the housing member, the portion of the transmission output shaft penetrating the belt transmission casing can be easily separated together with the belt transmission casing from the portion of the transmission output shaft supported by the partition wall of the housing member, so that the belt transmission can be easily exposed for convenient maintenance of it, especially for exchange of a belt. Further, the separable joint of the portions of the transmission output shaft in the belt transmission chamber saves labor for attaching or detaching the transmission output shaft to and from the belt transmission casing or the housing member, thereby facilitating assembly and disassembly of the belt transmission chamber.

These and other objects, features and advantages of the invention will appear more fully in the following detailed description with reference to attached drawings.

BRIEF DESCRIPTION OF THE DRAWINGS

FIG. 16(b) illustrates clutch chamber casing 73 joined to differential chamber casing 74 so as to project shifter housing member 73b and actuator 83 from clutch housing member 73a in another direction with respect to the center axis of clutch input and output shafts 71 and 72.

FIG. 18(b) illustrates clutch chamber casing 173 joined to differential chamber casing 174 so as to project shifter housing member 173b and actuator 83 from clutch housing member 173a in another direction degree with respect to the center axis of clutch input and output shafts 71 and 72.

DETAILED DESCRIPTION OF THE INVENTION

Figure 1:
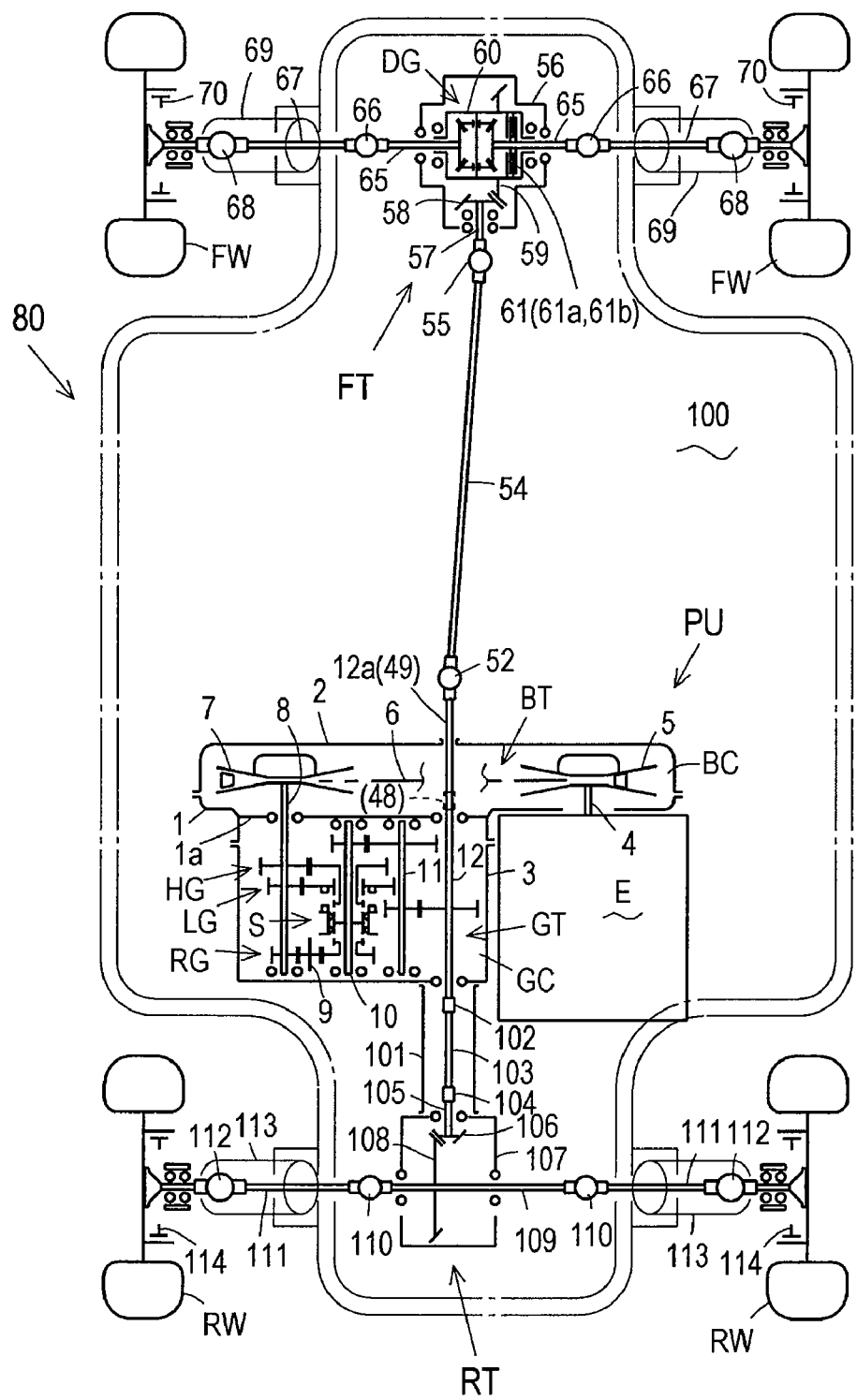
FIG. 1 is a skeleton diagram as a schematic sectional plan view of a four-wheel drive vehicle 80 equipped with a power unit PU, a front transaxle FT and a rear transaxle RT.

Referring to FIG. 1, a four-wheel driving vehicle 80 will be described. Vehicle 80 is provided with a vehicle body frame 100, which supports right and left rear wheels RW at right and left rear end portions thereof via respective suspensions 113, and supports right and left front wheels FW at right and left front end portions thereof via respective suspensions 69. Brakes 114 are provided in rims of respective rear wheels RW, and brakes 70 in rims of respective front wheels FW.

A rear transaxle RT is disposed at a laterally intermediate rear end portion of vehicle body frame 100. Rear transaxle RT includes a rear transaxle casing 107, a rear transaxle input shaft 105, a bevel pinion 106, a bevel final gear 108, and a rear axle 109. Rear transaxle input shaft 105 serving as an input shaft of rear transaxle RT is extended in the fore-and-aft direction of vehicle 80, is journalled by a front end portion of rear transaxle casing 107, and projects forwardly outward from the front end portion of rear transaxle casing 107. Bevel pinion 106 is fixed (or integrally formed) on a rear end of rear transaxle input shaft 105 in rear transaxle casing 107. Bevel final gear 108 is fixed on rear axle 109 in rear transaxle casing 107 and meshes with bevel pinion 106.

Rear axle 109 is extended in the lateral direction of vehicle 80, is journalled by right and left end portions of rear transaxle casing 107, and projects at right and left end portions thereof rightwardly and leftwardly outward from the right and left end portions of rear transaxle casing 107. Each of the right and left end portions of rear axle 109 projecting rightwardly and leftwardly outward from the right and left end portions of rear transaxle casing 107 is drivingly connected to a hub of corresponding rear wheel RW via a propeller shaft 111 and universal joints 110 and 112 provided on opposite ends of propeller shaft 111.

A front transaxle FT is disposed at a substantially laterally middle front end portion of vehicle body frame 100. Front transaxle FT includes a front transaxle casing 56, a front transaxle input shaft 57, a differential gear device DG, and a pair of right and left front axles 65. Front transaxle input shaft 57 serving as an input shaft of front transaxle FT is extended in the fore-and-aft direction of vehicle 80, is journalled by a rear end portion of front transaxle casing 56, and projects rearwardly outward from the rear end portion of front transaxle casing 56. In front transaxle casing 56, a bevel pinion 58 is fixed (or integrally formed) on a front end of front transaxle input shaft 57.

In front transaxle casing 56, differential gear device DG differentially connects right and left front axles 65 to each other. A bull gear 59 is fixed on a differential casing 60 of differential gear device DG so as to serve as an input gear of differential gear device DG A structure of differential gear device DG is detailed in later description of similar differential gear device DG in an alternative front transaxle FT1. However, as a feature different from later-discussed differential gear device DG of front transaxle FT1, differential gear device DG of front transaxle FT shown in FIG. 1 is provided with multi friction discs 61 including friction discs 61a and 61b disposed in differential casing 60 and around one front axle 65 (in this embodiment, right front axle 65). Friction discs 61a are fitted to differential casing 60 unrotatably relative to differential casing 60. Friction discs 61b are fitted to axle 65 unrotatably relative to axle 65. Friction discs 61a and friction discs 61b are alternately aligned along axle 65, and are frictionally pressed against one another so as to restrict rotatability of axle 65 relative differential casing 60, thereby restricting the differential rotatability of right and left axles 65, i.e., of right and left front wheels FW. In this way, differential gear device DG of front transaxle FT is a limited slip differential gear device convenient for escaping vehicle 80 from being stuck.

Right and left front axles 65 are coaxially extended in the lateral direction of vehicle 80, are journalled by respective right and left end portions of front transaxle casing 56, and project rightwardly and leftwardly outward from the right and left end portions of front transaxle casing 56. Each of right and left front axles 65 projecting rightwardly and leftwardly outward from the right and left end portions of front transaxle casing 56 is drivingly connected to a hub of corresponding front wheel FW via a propeller shaft 67 and universal joints 66 and 68 provided on opposite ends of propeller shaft 67.

Power unit PU is an assembly of an engine E, a belt transmission BT driven by engine E, and a gear transmission GT serving as a second transmission driven by belt transmission BT. To constitute a belt transmission chamber BC incorporating belt transmission BT, a belt transmission casing 2 is joined at a rear end thereof to a front end of a housing member 1, so that belt transmission casing 2 serves as a front main portion of belt transmission chamber BC covering substantially the whole of belt transmission BT, and housing member 1 serves as a rear end portion of belt transmission chamber BC disposed rearward from belt transmission BT. To constitute a gear transmission chamber GC incorporating gear transmission GT, a gear transmission casing 3 is joined at a front end thereof to a rear end of a left portion of housing member 1, so that housing member 1 serves as a front end portion of gear transmission chamber GC, and gear transmission casing 3 serves as a rear main portion of gear transmission chamber GC.

Engine E is fixed at a front end thereof to a rear end of a right portion of housing member 1 so that engine E and gear transmission chamber GC are juxtaposed rightward and leftward in vehicle 80, and belt transmission chamber BC is disposed forward of engine E and gear transmission chamber GC. Engine E has a horizontal engine output shaft 4 projecting forward into belt transmission chamber BC through the rear end of the right portion of housing member 1 so as to serve as a drive pulley shaft, on which a split pulley serving as drive pulley 5 is provided in belt transmission chamber BC.

Gear transmission GT includes horizontal shafts 8, 9, 10, 11 and 12 extended in the fore-and-aft direction of vehicle 80 and parallel to one another and to engine output shaft 4. Transmission input shaft 8 serves as an input shaft of gear transmission GT for receiving output power of belt transmission BT. Transmission output shaft 12 serves as an output shaft of gear transmission BT for outputting power to front and rear transaxles FT and RT. As discussed later, a low speed gear train LG, a high speed gear train HG, and a reversing gear train RG are extended from transmission input shaft 8, and one selected from these gear trains LG, HG and RG is drivingly connected to first transmission intermediate shaft 10 by a shifter S, so as to transmit power from transmission input shaft 8 to first transmission intermediate shaft 10. Second transmission intermediate shaft 11 transmits the power from first transmission intermediate shaft 10 to transmission output shaft 12. Idling shaft 9, serving as a part of reversing gear train RG, receives power from transmission input shaft 8, and is adapted to transmit the power to first transmission intermediate shaft 10 via shifter S.

Housing member 1 is formed therein with a partition wall 1a between the rear end portion of belt transmission chamber BC and the front portion of gear transmission chamber GC. Partition wall 1a journals transmission input shaft 8, transmission output shafts 12, and front ends of first and second transmission intermediate shafts 10 and 11 via respective bearings. A front portion of transmission input shaft 8 penetrates partition wall 1a and extends into belt transmission chamber BC so as to serve as a driven pulley shaft, on which a split pulley serving as a driven pulley 7 is provided.

In belt transmission chamber BC, belt transmission BT is configured so as to include drive pulley 5, driven pulley 7, and a belt 6 looped over drive pulley 5 and driven pulley 7. Grooves of respective pulleys 5 and 7 into which belt 6 is fitted have variable widths that are changed according to variation of output rotary speed of engine E, speed shift of gear transmission GT, and/or another variable parameter, thereby changing a gear ratio between pulleys 5 and 7, i.e., between drive and driven pulley shafts 4 and 8. Therefore, belt transmission BT is a continuously variable transmission (CVT).

A shaft casing 101 is fixed at a front end thereof to a rear end portion of gear transmission casing 3, and is fixed at a rear end thereof to the front end portion of rear transaxle casing 107, so as to extend between gear transmission casing 3 and rear transaxle casing 107. A rear end portion of transmission output shaft 12 projects rearward from the rear end portion of gear transmission casing 3 into shaft casing 101. A front end portion of rear transaxle input shaft 105 projects forward from the front end portion of rear transaxle casing 107 into shaft casing 101. In shaft casing 101, a rear output shaft 103 is joined at a front end thereof to the rear end of transmission output shaft 12 via a coupling sleeve 102 so as to extend coaxially to transmission output shaft 12 and in the fore-and-aft direction of vehicle 80, thereby serving as a rearward extension portion of transmission output shaft 12. In shaft casing 101, rear output shaft 103 is joined at a rear end thereof to the front end of rear transaxle input shaft 105 via a coupling sleeve 104, similar to coupling sleeve 102, so as to extend coaxially to rear transaxle input shaft 105 and in the fore-and-aft direction of vehicle 80. In this way, transmission output shaft 12, rear output shaft 103 and rear transaxle input shaft 105 are coaxially joined to one another so as to be not rotatable relative to one another.

Transmission output shaft 12 is extended forward through partition wall 1a, and has a forward extension which is extended through belt transmission chamber BC and a front end portion of belt transmission casing 2 so as to project at a front end thereof forward from belt transmission casing 2. A rear end portion of front transaxle input shaft 57 projects rearwardly outward from the rear end portion of front transaxle casing 56. A propeller shaft 54 is coupled at a rear end thereof to the front end of the forward extension of transmission output shaft 12 in front of the front end portion of belt transmission casing 2 via a universal joint 52, and is coupled at a front end thereof to the rear end of front transaxle input shaft 57 via a universal joint 55, so as to transmit power from transmission output shaft 12 to front transaxle input shaft 57. Although transmission output shaft 12 is axially deviated from front transaxle input shaft 57, propeller shaft 54 is slanted and universal joints 52 and 55 absorb the axial deviation of shaft 12 from shaft 57.

To serve as the forward extension of transmission output shaft 12, which is extended forward from partition wall 1a of housing member 1 through belt transmission chamber BC so as to be drivingly connected to propeller shaft 54 via universal joint 52, transmission output shaft 12 may be formed integrally with a front portion 12a as discussed later with reference to FIGS. 4 and 5, or alternatively, transmission output shaft 12 may be provided with a front output shaft 49, which is separated from transmission output shaft 12 journalled by partition wall 1a of housing member 1 and gear transmission casing 3 and is coaxially coupled to transmission output shaft 12 via a coupling sleeve 48 unrotatably relative to shaft 12 as discussed later with reference to FIGS. 7 and 8.

Figure 2:
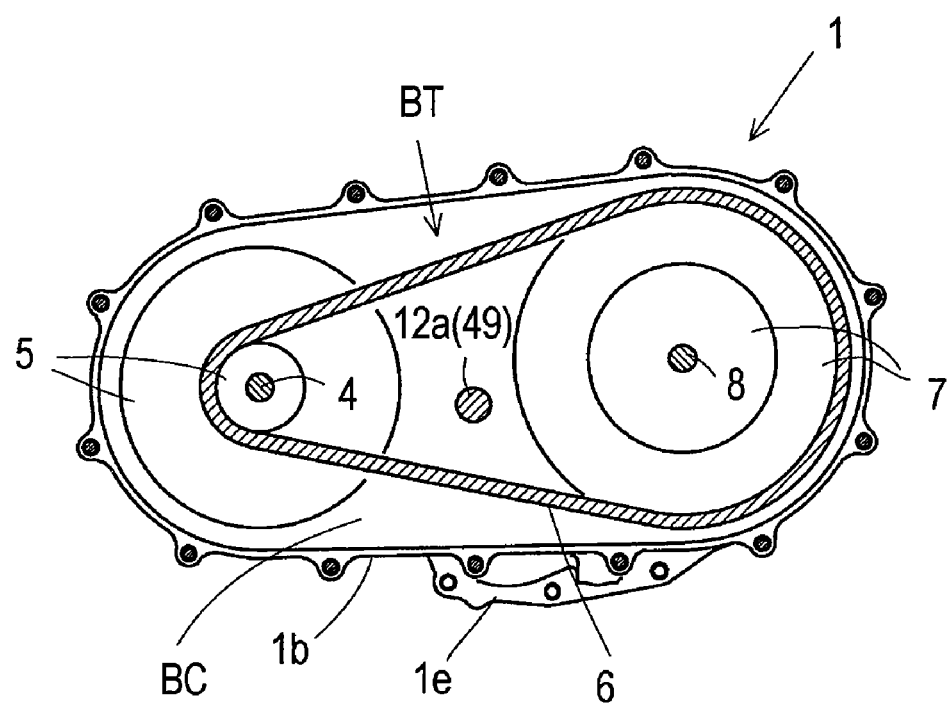
FIG. 2 is a front view of a housing member 1 and a belt transmission BT assembled in housing member 1 to constitute power unit PU, serving as a cross sectional view taken along II-II line of FIG. 4.

Power unit PU will be further described with reference to FIGS. 2-8, avoiding repeat of the above-mentioned things. As shown in FIG. 2, in belt transmission BT, belt 6 has upper and lower portions between drive and driven pulleys 5 and 7. One of the upper and lower portions of belt 6 runs from drive pulley 5 to driven pulley 7, and the other of the upper and lower portions of belt 6 runs from driven pulley 7 to drive pulley 5. In belt transmission chamber BC, the forward extension of transmission output shaft 12 (i.e., front portion 12a or front output shaft 49) is extended through a portion of belt transmission BT between drive and driven pulleys 5 and 7 and between the upper and lower portions of belt 6.

Figure 3:
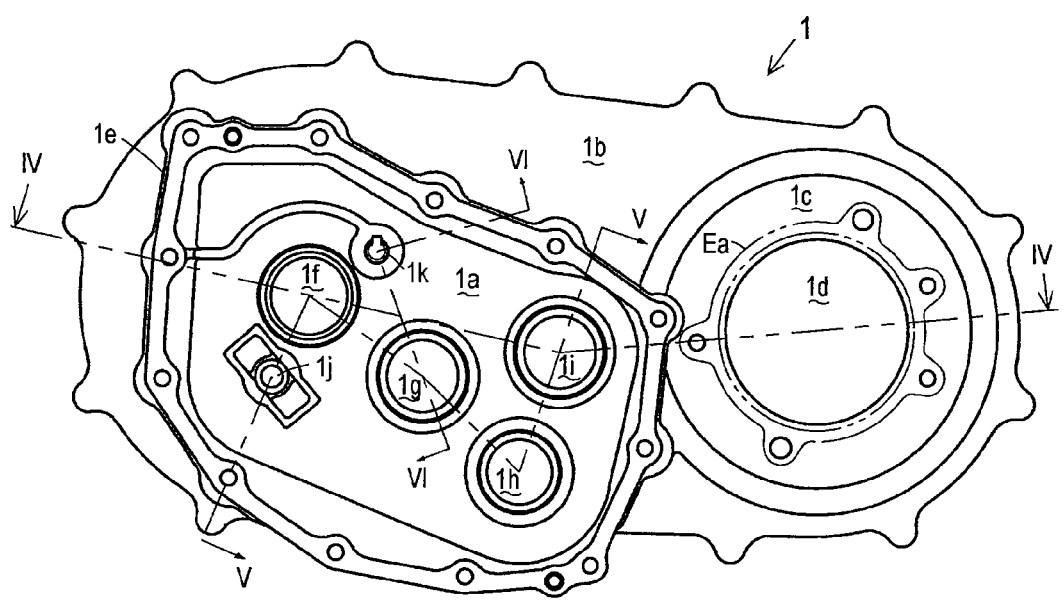
FIG. 3 is a rear view of housing member 1, serving as a cross sectional view taken along III-III line of FIG. 4.
Figure 4:
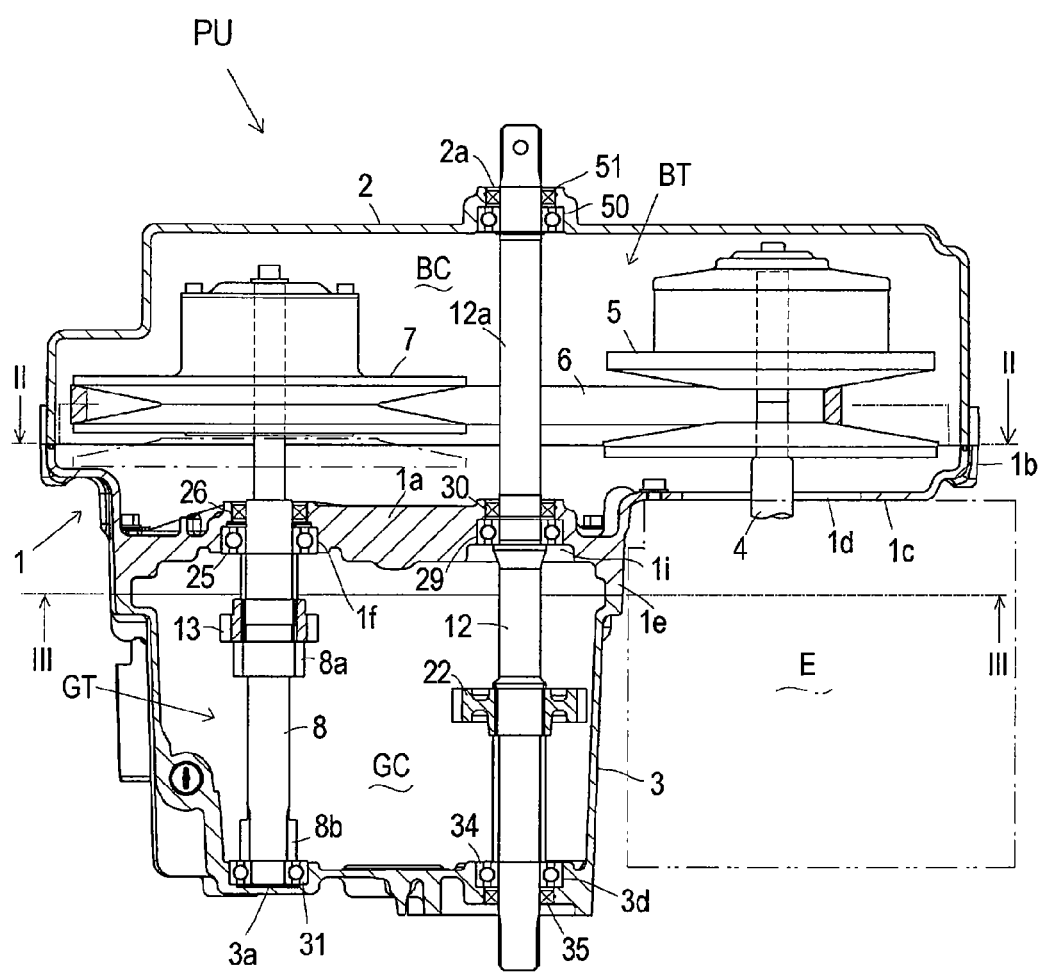
FIG. 4 is a sectional view of power unit PU when taken along IV-IV line of FIG. 3, showing a forward extension of a transmission output shaft 12 according to a first embodiment, and a gear transmission chamber GC, and omitting a detail structure of a gear transmission GT in gear transmission chamber GC.
Figure 5:
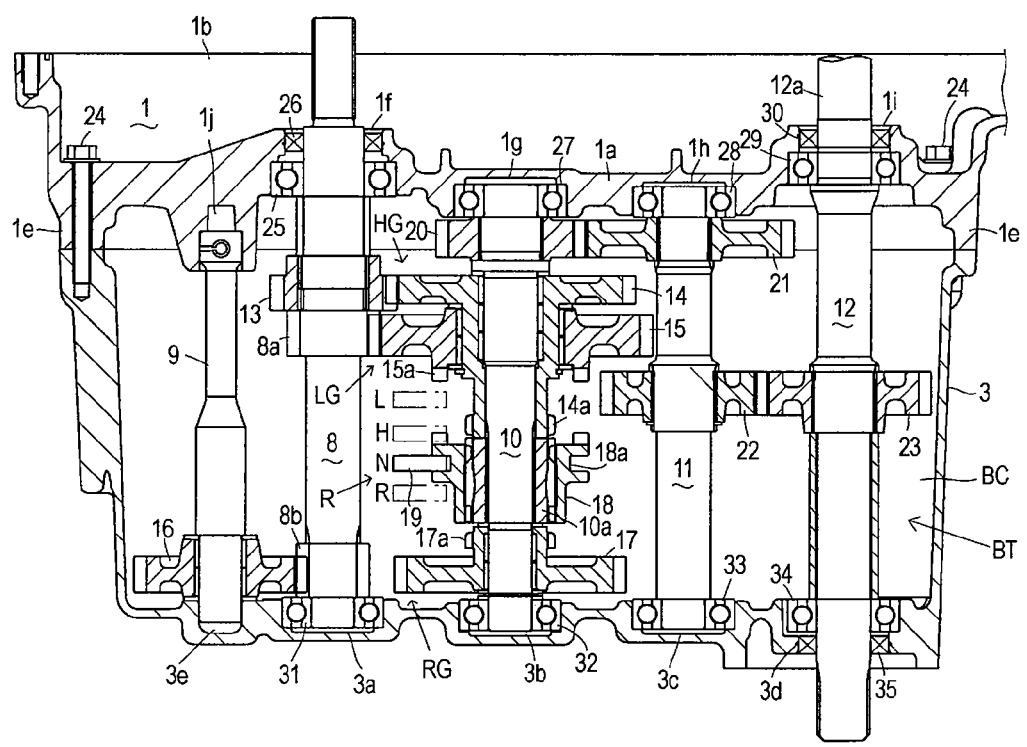
FIG. 5 is a cross sectional view of power unit PU when developed along V-V line of FIG. 3 according to the first embodiment, showing the forward extension of transmission output shaft 12 according to the first embodiment, and the detail structure of gear transmission GT in gear transmission chamber GC.

As shown in FIGS. 3-5, a front portion of housing member 1 is formed as a rear belt transmission cover 1b having a vertical front end surface surrounding an opening. Belt transmission casing 2 has a vertical rear end surface surrounding an opening so as to correspond to rear belt transmission cover 1b. Belt transmission casing 2 is joined at the rear end surface thereof to the front end surface of rear belt transmission cover 1b, and is fastened to cover 1b by bolts 24 so as to constitute belt transmission chamber BC for incorporating belt transmission BT.

Referring to FIGS. 3 and 4, a right portion of a vertical rear end surface of rear belt transmission cover 1b serves as an engine mounting surface 1c onto which the front end of engine E is attached. Engine mounting surface 1c has an opening 1d for passing engine output shaft 4 therethrough. Engine E is provided with a flange Ea. Flange Ea is fitted to engine mounting surface 1c so as to surround opening 1d, and is fastened to housing member 1 by bolts, thereby fixing engine E to housing member 1.

A rear left portion of housing member 1 is formed as a front gear transmission cover 1e. Front gear transmission cover 1e is extended rearward from a rear left portion of rear belt transmission cover 1b so as to surround foresaid partition wall 1a, and is further extended rearward so as to have a rearwardly opened vertical rear end surface to be joined to the front end of gear transmission casing 3, as shown in FIG. 4.

Referring to FIGS. 3 and 5, partition wall 1a of housing member 1 is formed with recesses 1g, 1h, 1j and 1k, which are opened rearward to gear transmission chamber GC and are closed forward to belt transmission chamber BC. Bearings 27 and 28 are fitted into respective recesses 1g and 1h, and transmission intermediate shafts 10 and 11 are fitted at the front end portions thereof into respective bearings 27 and 28 in respective recesses 1g and 1h so as to be journalled by partition wall 1a via respective bearings 27 and 28. Idling shaft 9 is fitted at a front end portion thereof into recess 1j so as to be supported by partition wall 1a. A fork shaft 36 (see FIG. 6) having a fore-and-aft horizontal axis is fitted at a front end portion thereof into recess 1k so as to be axially slidably supported by partition wall 1a. Recesses 1g, 1h, 1j and 1k do not allow leak of lubricating fluid from gear transmission chamber GC to belt transmission chamber BC along respective shafts 10, 11, 9 and 36 because they are closed forward to belt transmission chamber BC.

Referring to FIGS. 3-5, partition wall 1a is formed with holes 1f and 1i, which are opened rearward to gear transmission chamber GC and are opened forward to belt transmission chamber BC. A bearing 25 and a fluid-seal 26 are fitted into hole 1f, and transmission input shaft 8 is fittingly passed through bearing 25 and fluid-seal 26 in hole 1f so as to be journalled by partition wall 1a via bearing 25. A bearing 29 and a fluid-seal 30 are fitted into hole 1i, and transmission output shaft 12 is fittingly passed through bearing 29 and fluid-seal 30 in hole 1i so as to be journalled by partition wall 1a via bearing 29.

Bearings 25 and 29 are exposed rearward to gear transmission chamber GC, and fluid-seals 26 and 30 are disposed forward of respective bearings 25 and 29 so as to be exposed forward to belt transmission chamber BC. Fluid-seals 26 and 30 prevent lubricating fluid in gear transmission chamber GC from leaking into belt transmission chamber BC along respective shafts 8 and 12. Therefore, belt transmission BT in belt transmission chamber BC is free from influence of metal powder generated by rubbing of gears of gear transmission GT and involved in the lubricating fluid in gear transmission chamber GC.

Figure 6:
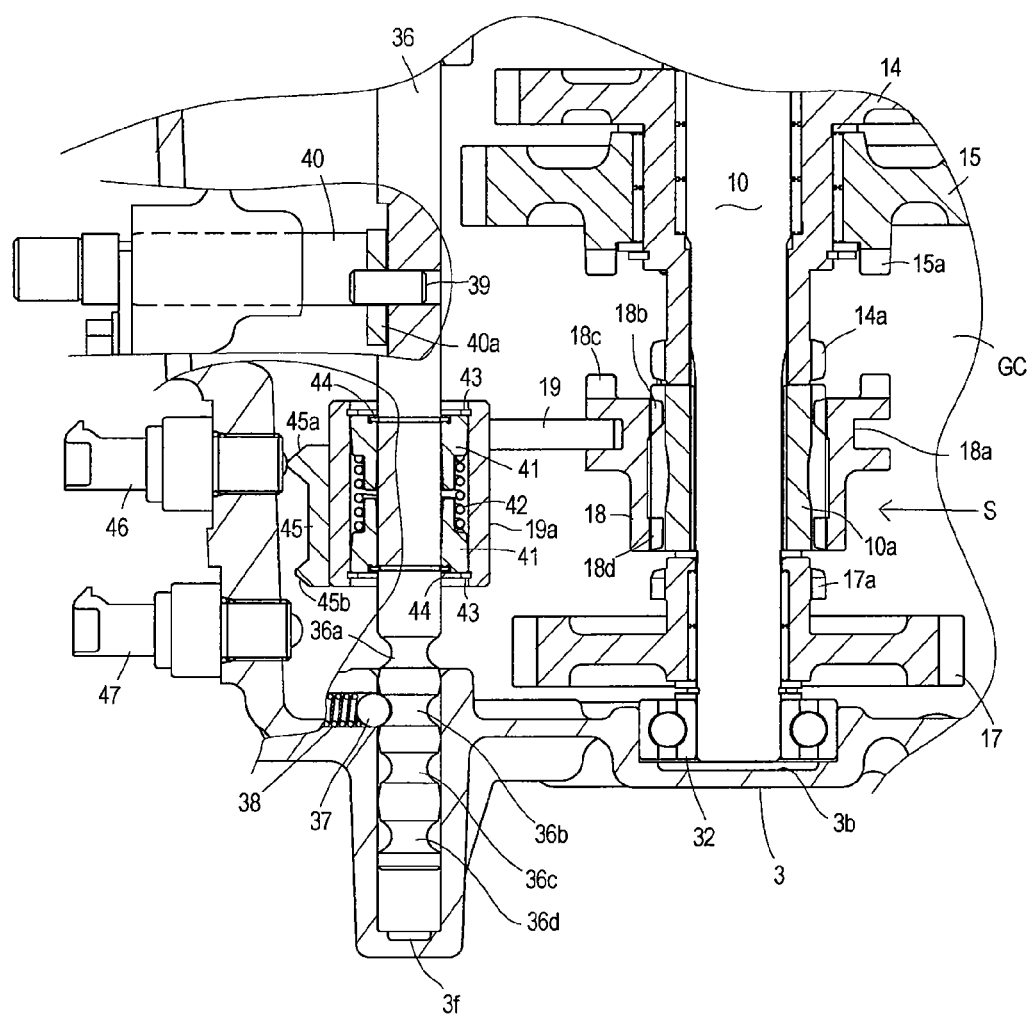
FIG. 6 is a cross sectional view of power unit PU when developed along VI-VI line of FIG. 3, showing the detail structure of gear transmission GT in gear transmission chamber GC.

Referring to FIGS. 4-6, as mentioned above, gear transmission casing 3 is joined at the front end thereof to the rear end of front gear transmission cover 1e of housing member 1, and is fastened to housing member 1 by bolts 24 as shown in FIG. 4, thereby constituting gear transmission chamber GC for incorporating gear transmission GT. Gear transmission casing 3 is formed in a rear end wall portion thereof with recesses 3a, 3b, 3c, 3e and 3f, which are opened forward to gear transmission chamber GC and are closed rearward to the outside of gear transmission casing 3.

As shown in FIGS. 4 and 5, bearings 31, 32 and 33 are fitted into respective recesses 3a, 3b and 3c, and shafts 8, 10 and 11 are fitted at rear end portions thereof into respective bearings 31, 32 and 33 in respective recesses 3a, 3b and 3c so as to be journalled by the rear end wall of gear transmission casing 3 via respective bearings 31, 32 and 33. As shown in FIG. 5, idling shaft 9 is fitted at a rear end portion thereof into recess 3e so as to be supported by the rear end wall of gear transmission casing 3. As shown in FIG. 6, fork shaft 36 is fitted at a rear end portion thereof into recess 3f so as to be axially slidably supported by the rear end wall of gear transmission casing 3.

The rear end wall of gear transmission casing 3 is formed with a hole 3d, which is opened forward to gear transmission chamber GC and is opened rearward to the inside of shaft casing 101 shown in FIG. 1. A bearing 34 and a fluid-seal 35 are fitted into hole 3d, and transmission output shaft 12 is fittingly passed through bearing 34 and fluid-seal 35 in hole 3d so as to be journalled by the rear end wall of gear transmission casing 3 via bearing 34. Bearing 34 is exposed forward to gear transmission chamber GC, and fluid-seal 35 is disposed rearward of bearing 34 so as to be exposed rearward to the inside of shaft casing 101, thereby preventing lubricating fluid in gear transmission chamber GC from leaking into shaft casing 101 along transmission output shaft 12.

Referring to a mechanism of gear transmission GT in gear transmission chamber GC, as shown in FIGS. 4 and 5, transmission input shaft 8 is formed integrally with drive gears 8a and 8b. A drive gear 13 is fixed on transmission input shaft 8 adjacent to drive gear 8a. In this way, drive gears 8a, 8b and 13 are provided on transmission input shaft 8 unrotatably relative to shaft 8.

A driven gear 14 is fitted on first transmission intermediate shaft 10 rotatably relative to shaft 10, and directly meshes with drive gear 13, so that mutually meshing gears 13 and 14 constitute high speed gear train HG for rotating transmission output shaft 12 in a forward traveling direction of vehicle 80 at a high speed level.

Driven gear 14 is formed integrally with an axial center boss extended rearward along first transmission intermediate shaft 10, and a driven gear 15 is fitted on the axial center boss of driven gear 14 rotatably relative to driven gear 14, and directly meshes with drive gear 8a, so that mutually meshing gears 8a and 15 constitute low speed gear train LG for rotating transmission output shaft 12 in the forward traveling direction of vehicle 80 at a low speed level.

An idle gear 16 is fitted on idling shaft 9 adjacent to the rear end wall of gear transmission casing 3 rotatably relative to shaft 9, and directly meshes with drive gear 8b. A driven gear 17 is fitted on first transmission intermediate shaft 10 adjacent to bearing 32 rotatably relative to shaft 10, and directly meshes with idle gear 16. In this way, gears 8b, 16 and 17 mesh with one another so as to constitute reversing gear train RG for rotating transmission output shaft 12 in a backward traveling direction of vehicle 80.

Referring to FIGS. 5 and 6, shifter S is provided on first transmission intermediate shaft 10 between driven gears 14 and 17. Shifter S includes a spline hub 10a and a clutch slider 18. Spline hub 10a is fixed on first transmission intermediate shaft 10. Clutch slider 18 is spline-fitted on an outer peripheral surface of spline hub 10a so as to be unrotatable relative spline hub 10a, i.e., shaft 10, and be axially slidable along spline hub 10a. Clutch teeth 14a are formed on a rear end of the axial center boss of driven gear 14 adjacent to a front end of spline hub 10a so as to enable gear 14 to mesh with clutch slider 18. Driven gear 15 is formed on a rear end thereof with clutch teeth 15a so that driven gear 15 can mesh with clutch slider 18. Driven gear 17 is formed with an axial center boss extended forward along first transmission intermediate shaft 10 towards spline hub 10a, and the axial center boss of driven gear 17 is peripherally formed thereon with clutch teeth 17a so as to enable driven gear 17 to mesh with clutch slider 18.

Clutch slider 18 is formed integrally with clutch teeth 18b, 18c and 18d (see FIG. 6) such as to correspond to respective clutch teeth 14a, 15a and 17a. Further, clutch slider 18 is formed on an outer periphery thereof with an annular groove 18a, into which a fork 19 is fitted. As shown in FIG. 5, fork 19 is shiftable integrally with clutch slider 18 among a low speed position L, a high speed position H, a neutral position N, and a reversing position R. In this regard, in FIG. 5, fork 19 at neutral position N is drawn in solid lines, and phantom lines are drawn to define positions L, H and R of fork 19.

When fork 19 is set at neutral position N, none of clutch teeth 18b, 18c and 18d mesh with any of clutch teeth 14a, 15a and 17a, i.e., clutch slider 18 meshes with none of gears 14, 15 and 17, so as to separate spline hub 10a from gears 14, 15 and 17, i.e., to isolate first transmission intermediate shaft 10 and shafts 11 and 12 downstream of shaft 10 from rotations of gear trains HG, LG and RG driven by transmission input shaft 8, thereby transmitting no power to wheels FW and RW.

When fork 19 is set at high speed position H forward from neutral position N, clutch teeth 18b meshes with clutch teeth 14a, i.e., clutch slider 18 meshes with gear 14, so as to drivingly connect high speed gear train HG to spline hub 10a, thereby transmitting power from transmission input shaft 8 via high speed gear train HG to first transmission intermediate shaft 10 so as to rotate wheels FW and RW for high-speed forward traveling of vehicle 80.

When fork 19 is set at low speed position L forward from high speed position H, clutch teeth 18c meshes with clutch teeth 15a, i.e., clutch slider 18 meshes with gear 15, so as to drivingly connect low speed gear train LG to spline hub 10a, thereby transmitting power from transmission input shaft 8 via low speed gear train LG to first transmission intermediate shaft 10 so as to rotate wheels FW and RW for low-speed forward traveling of vehicle 80.

When fork 19 is set at reversing position R rearward from neutral position N, clutch teeth 18d meshes with clutch teeth 17a, i.e., clutch slider 18 meshes with gear 17, so as to drivingly connect reversing gear train RG to spline hub 10a, thereby transmitting power from transmission input shaft 8 via reversing gear train RG to first transmission intermediate shaft 10 so as to rotate wheels FW and RW for backward traveling of vehicle 80.

Referring to FIG. 6, a boss 19a is formed integrally with fork 19, and is provided around on fork shaft 36 so as to be movable integrally with the axial slide of fork shaft 36. A pivot shaft 40 is extended in a radial direction of fork shaft 36, and is pivotally supported by a wall of gear transmission casing 3. In gear transmission chamber GC, pivot shaft 40 is formed at an inner end thereof integrally with an arm 40a, and arm 40a is pivotally connected to fork shaft 36 via a pin 39. An arm (not shown) is fixed on an outer end portion of pivot shaft 40 projecting outward from gear transmission casing 3, and is operatively connected to a speed shift manipulator, e.g., a lever or a pedal, provided in vehicle 80 for controlling shifter S. By manipulating the speed shift manipulator, pivot shaft 40 is rotated so as to be centered on its axis so as to axially move fork shaft 36 via arm 40a and pin 39.

Referring to FIG. 6, the rear end portion of fork shaft 36 to be axially slidably fitted into recess 3f is formed with four annular detent grooves 36a, 36b, 36c and 36d, which are aligned rearward in order so as to define four axial shift positions of fork shaft 36 corresponding to respective shift positions R, N, H and L of fork 19 shown in FIG. 5. A detent ball 37 and a spring 38 for biasing detent ball 37 toward fork shaft 36 are fitted in a wall of gear transmission casing 3, so that detent ball 37 can be fitted into any one of detent grooves 36a, 36b, 36c and 36d to retain fork shaft 36 at the corresponding shift position.

Fork 19 is allowed to axially slide slightly relative to fork shaft 36 so as to hold clutch slider 18 on standby for meshing of clutch teeth 18b, 18c or 18d of clutch slider 18 with clutch teeth 14a, 15a or 17a of target gear 14, 15 or 17. In this regard, in an annular space between an outer peripheral surface of fork shaft 36 and an inner peripheral surface of boss 19a, a pair of axially opposite front and rear slide members 41 are axially slidably fitted, and a spring 42 is interposed between front and rear slide members 41 so as to bias front and rear slide members 41 forward and rearward away from each other. A pair of front and rear retaining rings 43 are fixed to boss 19a so as to limit the slide of respective slide members 41 relative to boss 19a in the biasing direction of spring 42. A pair of front and rear retaining rings 44 are fixed to fork shaft 36 so as to limit the slide of respective slide members 41 relative to fork shaft 36 in the biasing direction of spring 42.

In an initial state, front retaining rings 43 and 44 retain front slide member 41 biased forward by spring 42, and rear retaining rings 43 and 44 retain rear slide member 41 biased rearward by spring 42, so that front and rear slide members 41 are separated from each other so as to have a gap therebetween. When fork shaft 36 is axially moved to one of its shift positions by manipulating the speed shift manipulator, fork 19 and clutch slider 18 are moved towards target gear 14, 15 or 17 together with fork shaft 36, and slide members 41 in boss 19a are kept in this initial state before an end surface of corresponding clutch teeth 18b, 18c or 18d of clutch slider 18 comes to contact an end surface of clutch teeth 14a, 15a or 17a of target gear 14, 15 or 17. After the end surface of clutch teeth 18b, 18c or 18d of clutch slider 18 is brought into contact with the end surface of clutch teeth 14a, 15a or 17a of target gear 14, 15 or 17, fork shaft 36 is further moved axially until fork shaft 36 reaches a target shift position thereof, and meanwhile, the end surface of clutch teeth 14a, 15a or 17a of target gear 14, 15 or 17 and the end surface of corresponding clutch teeth 18b, 18c or 18d are kept to contact each other, i.e., clutch slider 18 is held on standby for meshing with target gear 14, 15 or 17 before clutch teeth 14a, 15a or 17a synchromesh with corresponding clutch teeth 18b, 18c or 18d. In other words, fork shaft 36 axially moves relative to boss 19a, fork 19 and clutch slider 18 retained at the standby position.

The gap between slide members 41 and the movability of slide members 41 relative to each other enable the axial movement of fork shaft 36 relative to clutch slider 18 and fork 19. In this regard, for example, if gear 14 is the target gear and fork shaft 36 is moved forward from its neutral position, where detent ball 37 is fitted into groove 36b, to its high speed position, where detent ball 37 is fitted into groove 36c, a forward movement of fork shaft 36 relative to clutch slider 18 and fork 19 occurs after the front end surface of clutch teeth 18b contacts the rear end surface of clutch teeth 14a and before clutch teeth 18b synchromesh with clutch teeth 14a. During this forward movement of fork shaft 36 relative to clutch slider 18 and fork 19, rear retaining ring 44 fixed to fork shaft 36 pushes rear slide member 41 forward away from rear retaining ring 43 fixed to boss 19a which is retained together with fork 19 and clutch slider 18 at the standby position for meshing with target gear 14. Meanwhile, front retaining ring 43 fixed to boss 19a retains front slide member 41. Accordingly, as rear slide member 41 moves forward to approach retained front slide member 41, the gap between slide members 41 is reduced so as to compress spring 42. In other words, the gap absorbs the movement of fork shaft 36 relative to fork 19 and clutch slider 18.

Even if detent ball 37 is fitted into target groove 36c so as to stop fork shaft 36, clutch slider 18 is held at the standby position and spring 42 is compressed unless clutch teeth 14a of gear 14 rotated by power of transmission input shaft 8 becomes synchronous to clutch teeth 18b. As soon as clutch teeth 14a becomes synchronous to clutch teeth 18b, the end surface of clutch teeth 18b is released from pressure of the end surface of clutch teeth 14a, and spring 42 immediately expands to restore, so that, while rear slide member 41 is retained by rear retaining ring 44 fixed on fork shaft 36, front slide member 41 having been retained by front retaining ring 43 is pushed forward by the expansion of spring 42, and pushes boss 19a forward via front retaining ring 43, thereby quickly moving clutch slider 18 toward gear 14, and thereby quickly meshing clutch teeth 18b with clutch teeth 14a. The same thing is said when gear 15 or 17 is the target gear.

Referring to FIG. 6, position sensor switches 46 and 47 are fitted in a wall of gear transmission casing 3, and a switch-pushing member 45 formed integrally with pushing portions 45a and 45b is fixed on boss 19a. When fork 19 is positioned at neutral position N, pushing portion 45a pushes a switch portion of position sensor switch 46 so as to transmit an electric signal of recognition that shifter S is set in the neutral state for not-driving wheels FW and RW. When gear 14 completely synchromeshes with clutch slider 18 and fork 19 is positioned at reversing position R, pushing portion 45b pushes a switch portion of position sensor switch 47 so as to transmit an electric signal of recognition that shifter S is set in the reversing state for driving wheels FW and RW for the backward traveling of vehicle 80. For example, the electric signals are used for control of engine E, such that the electric signal from position sensor switch 46 must be received to confirm the neutral state of shifter S before starting engine E, and that the output rotary speed of engine E is reduced when the electric signal from position sensor switch 47 is received to recognize the reversing state of shifter S.

Referring to FIG. 5, in gear transmission chamber GC, a gear 20 is fixed on first transmission intermediate shaft 10 between gear 14 and bearing 27, and a gear 23 is fixed on an axial intermediate portion of transmission output shaft 12. A gear 21 is fixed on second transmission intermediate shaft 11 and meshes with gear 20. A gear 22 is fixed on second transmission intermediate shaft 11 and meshes with gear 23. Therefore, gears 20, 21, 22 and 23 constitute a gear train for transmitting power from first transmission intermediate shaft 10 to transmission output shaft 12 via second transmission intermediate shaft 11.

According to a first embodiment shown in FIGS. 4 and 5, transmission output shaft 12 is formed integrally with front portion 12a serving as the above-mentioned forward extension of transmission output shaft 12, which is passed through belt transmission chamber BC and has its front end forward from the front end of belt transmission casing 2. Alternatively, according to a second embodiment shown in FIGS. 7 and 8, additional front output shaft 49 is coaxially joined via coupling sleeve 48 to the real front end of transmission output shaft 12 projecting forward from partition wall 1a so as to serve as the forward extension of transmission output shaft 12.

In each of the first and second embodiments, belt transmission casing 2 is provided in a wall portion thereof with a hole 2a which is opened rearward to belt transmission chamber BC and is opened forward to the outside of belt transmission casing 2. A bearing 50 and a fluid-seal 51 immediately forward of bearing 50 are fitted into hole 2a, and front portion 12a or front output shaft 49 is fittingly passed through bearing 50 and fluid-seal 51 in hole 2a so as to be journalled by belt transmission casing 2 via bearing 50. Fluid-seal 51 cooperates with fluid-seals 26 and 30 in partition wall 1a so as to protect belt transmission BT in belt transmission chamber BC from impurities existing in a space outside of belt transmission chamber BC.

In the first embodiment of FIGS. 4 and 5, to assemble power unit PU, the assembling of gear transmission chamber GC, of gear transmission GT in gear transmission chamber GC, and of belt transmission BT onto shafts 4 and 8 is completed, and then, front portion 12a of transmission output shaft 12 projecting forward from belt transmission BT is passed through bearing 50 and fluid-seal 51, and belt transmission casing 2 is accessed to rear belt transmission cover 1b of housing member 1 and is finally joined and fastened to housing member 1 by bolts. Afterward, universal joint 52 is fitted on the front end of front portion 12a of transmission output shaft 12 disposed forward from belt transmission casing 2. For maintenance of belt transmission BT, universal joint 52 is removed from the front end of front portion 12a of transmission output shaft 12, and then, belt transmission casing 2 is separated from rear belt transmission cover 1b of housing member 1, is moved away from rear belt transmission cover 1b so as to slide bearing 50 and fluid-seal 51 against front portion 12a of transmission output shaft 12, and is finally removed from front portion 12a of transmission output shaft 12, thereby exposing belt transmission BT. However, for exchanging belt 6, long front portion 12a of transmission output shaft 12 projecting forward from partition wall 1a must be considered to avoid interfering with belt 6 being attached or detached to and from pulleys 5 and 7.

Figure 7:
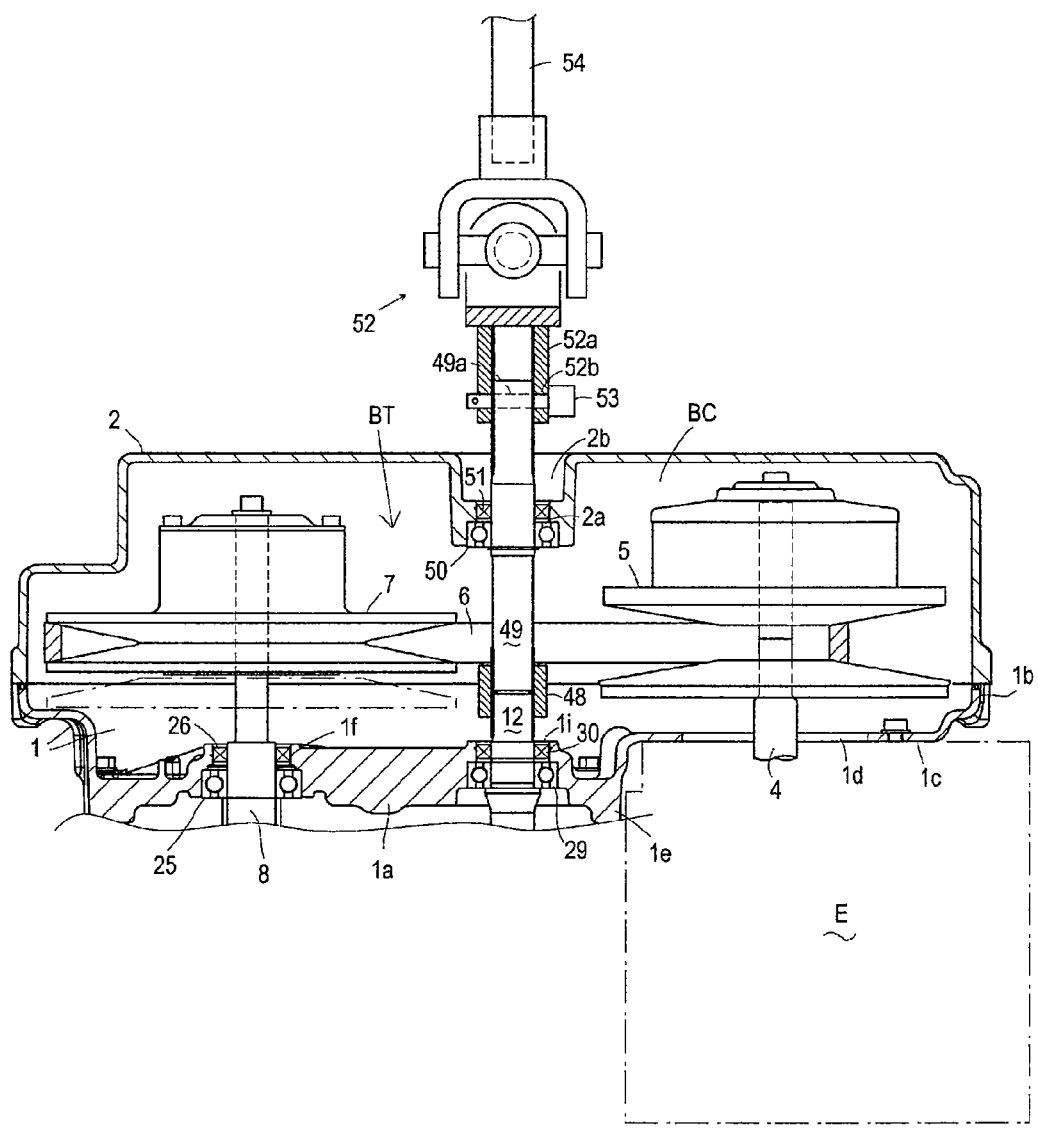
FIG. 7 is a cross sectional view of power unit PU when taken along IV-IV line of FIG. 3, showing an alternative forward extension of transmission output shaft 12 according to a second embodiment, and omitting gear transmission chamber GC.
Figure 8:
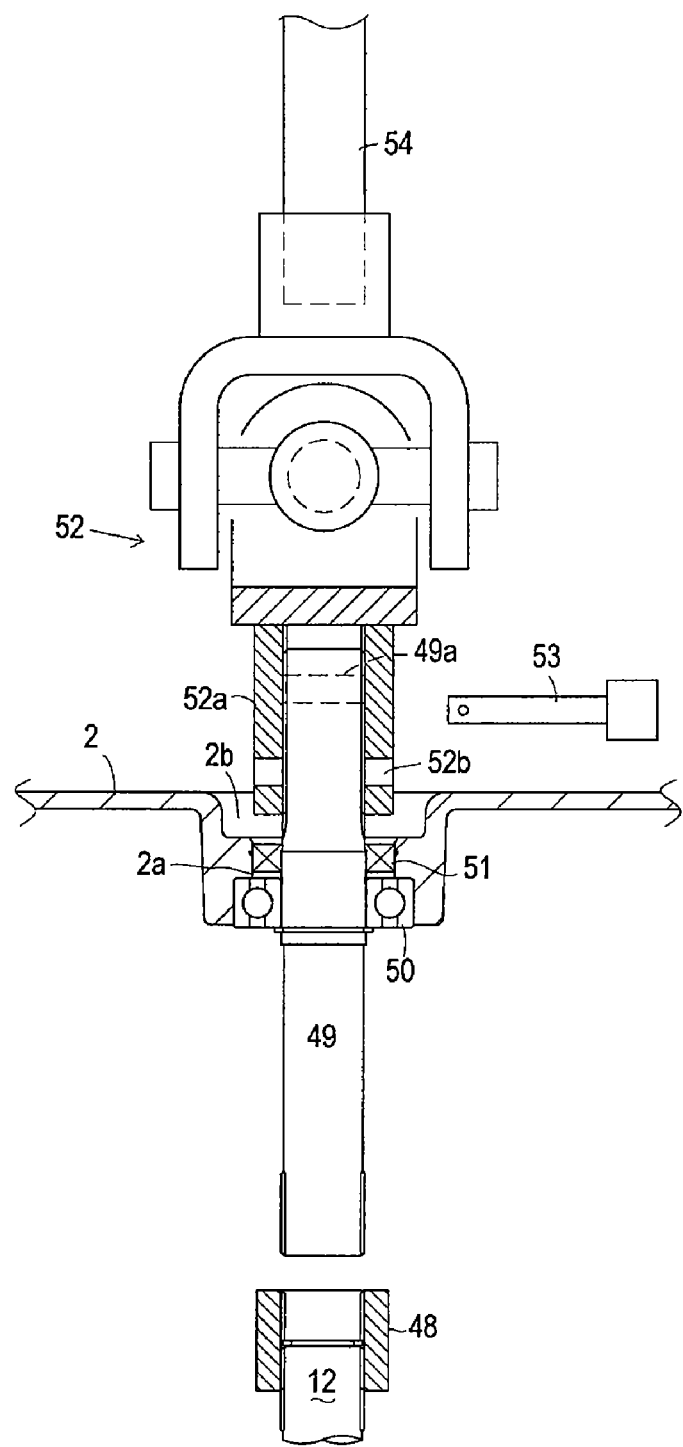
FIG. 8 is a plan view of a front output shaft 49 serving as the forward extension of transmission output shaft 12 according to the second embodiment when being removed from transmission output shaft 12.

The second embodiment of FIGS. 7 and 8, in which front output shaft 49 serving as the forward extension of transmission output shaft 12 penetrating belt transmission casing 2 is separable from transmission output shaft 12 as a main portion of transmission output shaft 12 supported by partition wall 1a of housing member 1, is advantageous in facilitating of assembling and disassembling for maintenance in comparison with the first embodiment of FIGS. 4 and 5. In this regards, belt 6 looped over pulleys 5 and 7 is disposed immediately forward from coupling sleeve 48 fitted on the front end of transmission output shaft 12 and the rear end of front output shaft 49, and immediately forward from a phantom vertical joint surface between casing 2 and cover 1b. Therefore, for maintenance of belt transmission BT, especially, for exchange of belt 6, when belt transmission casing 2 is moved away from rear belt transmission cover 1b, front output shaft 49 while being supported by bearing 50 can be moved together with belt transmission casing 2 without its slide against bearing 50 and fluid-seal 51 so as to be removed at a rear end thereof from coupling sleeve 48 being fitted on the front end of transmission output shaft 12. Thus, no extension part of transmission output shaft 12 exists in the area of belt transmission BT between pulleys 5 and 7 and between the upper and lower portions of belt 6 after belt transmission casing 2 with front output shaft 49 is removed from housing member 1 and transmission output shaft 12. Therefore, belt 6 can be exchanged without consideration of the obstructive existence of such a part of the transmission output shaft 12.

Further, the wall portion of belt transmission casing 2 having hole 2a, in which bearing 50 and fluid-seal 51 are fitted, is recessed rearward from a foremost wall portion of belt transmission casing 2, so as to form a recess 2b. In this regard, the front end portion of front output shaft 49 projecting forward from fluid-seal 51 is inserted and spline-fitted into a sleeve portion 52a of universal joint 52, is located to coincide its diametrical pin hole 49a to radial pin hole 52b formed in sleeve portion 52a, and is fixed to sleeve portion 52a via a retaining pin 53 passed through mutually coinciding pin holes 49a and 52b. After fitting retaining pin 53, a margin space is left in sleeve portion 52a so as to allow further forward slide of the front end portion of front output shaft 49 in sleeve portion 52a.

To remove belt transmission casing 2 from housing member 1 and to remove front output shaft 49 from transmission output shaft 12, retaining pin 53 is removed from pin holes 49a and 52b so as to allow the front end portion of front output shaft 49 to slide in sleeve portion 52a, and then, belt transmission casing 2 is separated from rear belt transmission cover 1b of housing member 1 by loosing the bolts and is moved forward away from housing member 1, so that front output shaft 49 supported by bearing 50 moves forward together with belt transmission casing 2 and slides at the front end portion thereof forward into the margin space in sleeve portion 52a of universal joint 52, thereby being naturally removed at the rear end thereof from coupling sleeve 48. As shown in FIG. 8, recess 2b receives a rear end portion of sleeve portion 52a of universal joint 52 moved rearward relative to front output shaft 49 when the front end portion of front output shaft 49 slides in the margin space in sleeve portion 52a. In this way, the whole universal joint 52 does not need to be removed from the front end of front output shaft 49 but only retaining pin 53 needs to be removed from sleeve portion 52a of universal joint 52 before separating belt transmission casing 2 from housing member 1.

Incidentally, coupling sleeve 48 is a sleeve splined on an inner peripheral surface thereof, so as to be fitted on the splined-front end of transmission output shaft 12 and the splined rear end of front output shaft 49, thereby coaxially and rigidly coupling shafts 12 and 49. Other coupling sleeves 102 and 104 shown in FIG. 1 are similar to coupling sleeve 48.

Figure 9:
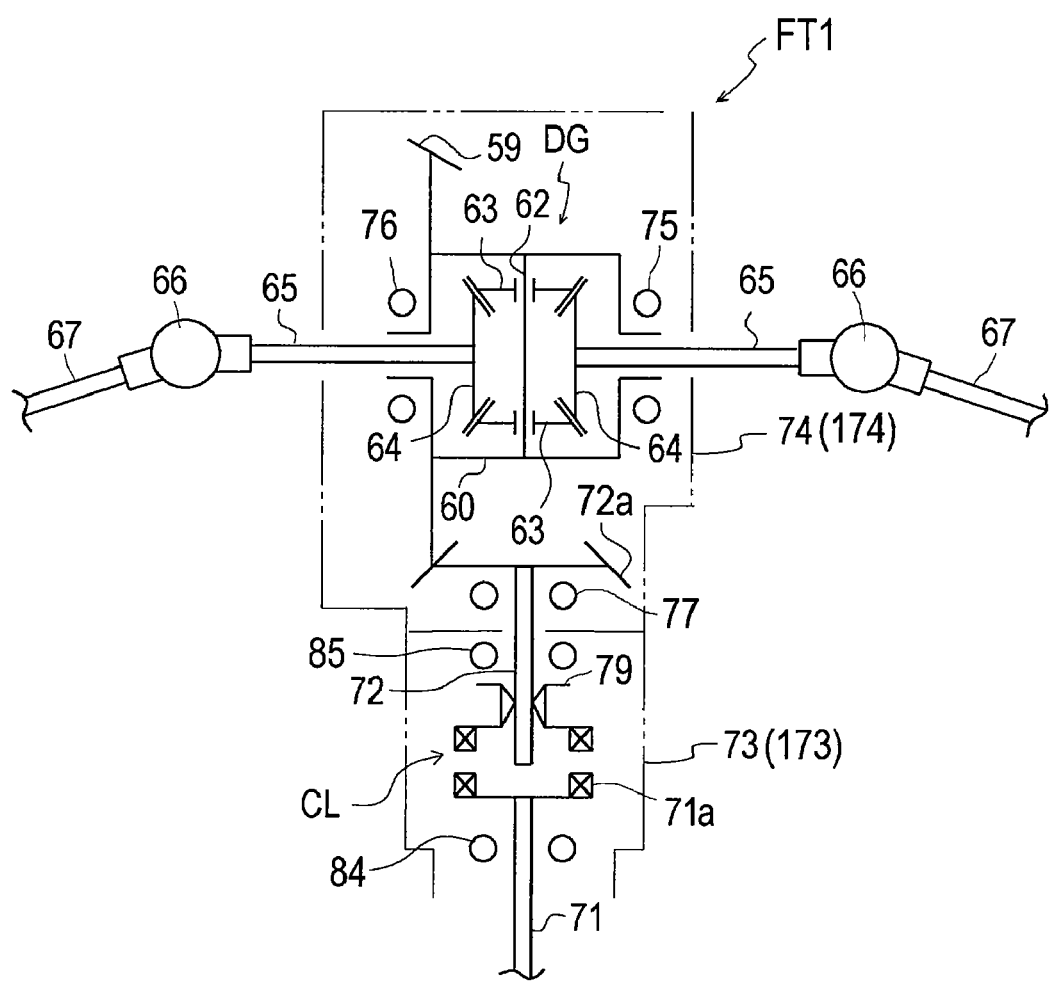
FIG. 9 is a skeleton diagram as a schematic sectional plan view of an alternative front transaxle FT1 including a clutch chamber casing 73 (or 173) incorporating a clutch CL and a differential chamber casing 74 (or 174) incorporating a differential gear device DG.
Figure 10:
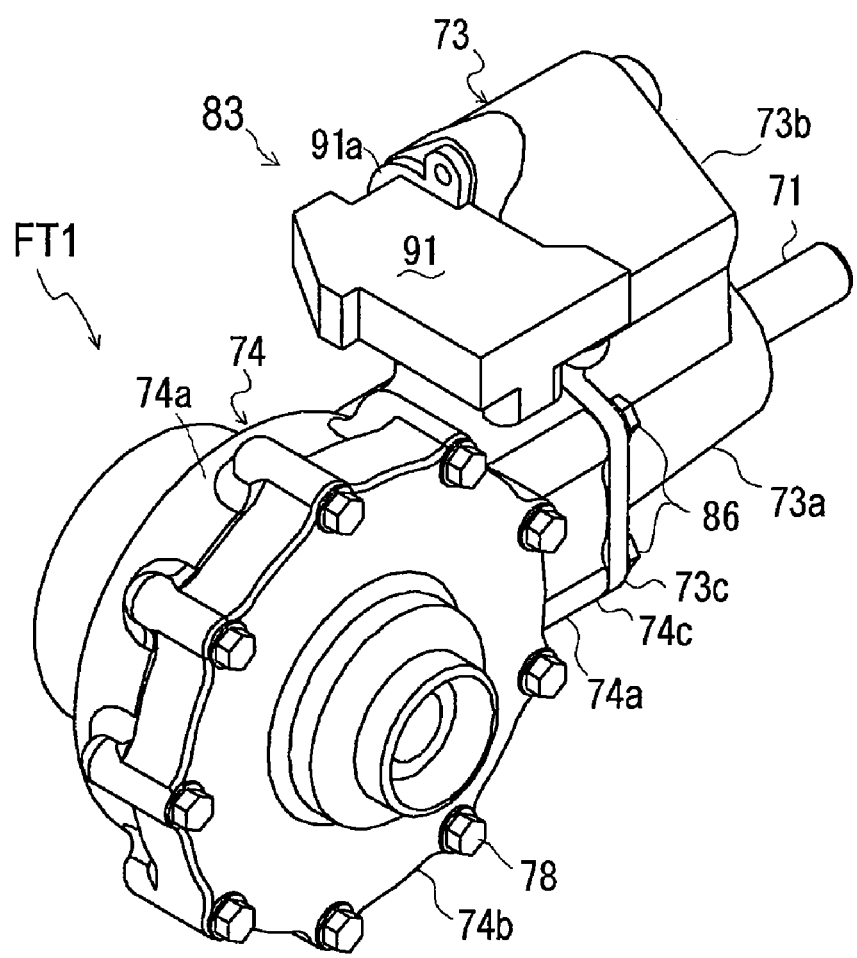
FIG. 10 is a perspective view of front transaxle FT1, wherein clutch chamber casing 73 is formed with a regular-pentagonal flange 73c, differential chamber casing 74 is formed with a regular-pentagonal flange 74c, and casings 73 and 74 are joined by joining flanges 73c and 74c to each other.
Figure 11:
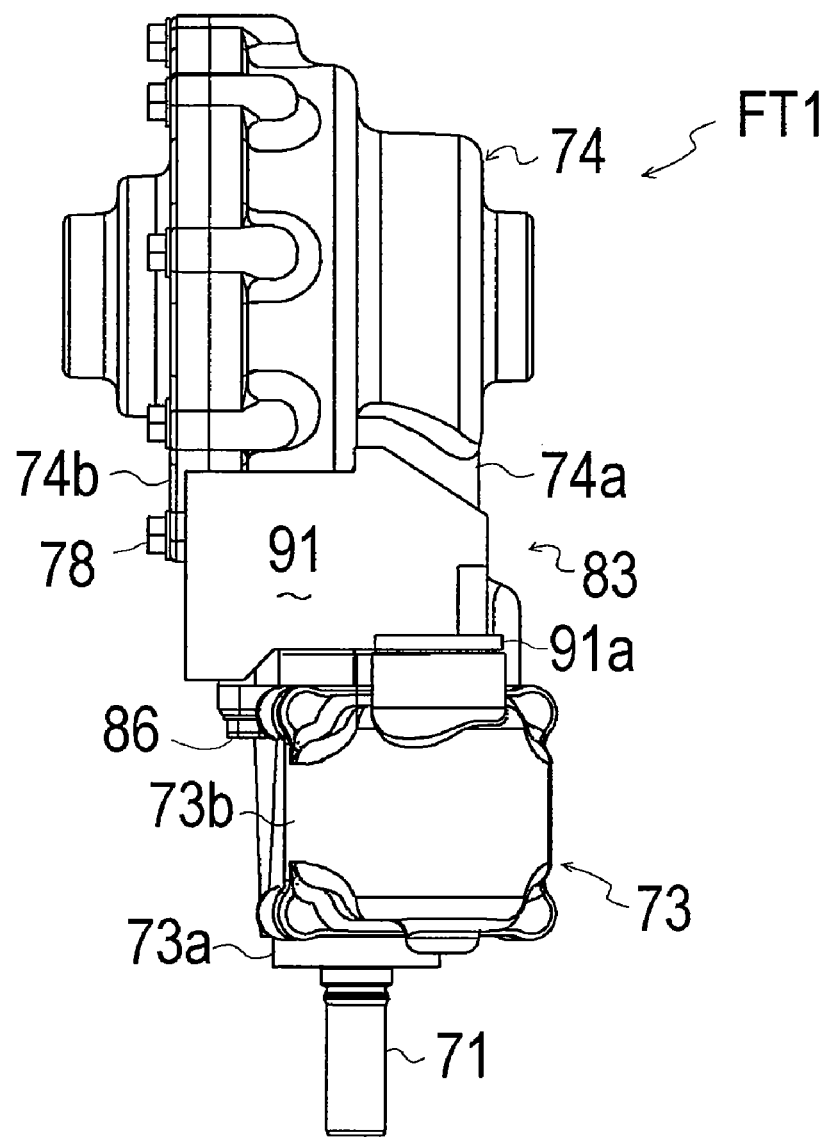
FIG. 11 is a plan view of front transaxle FT1 shown in FIG. 10.
Figure 13:
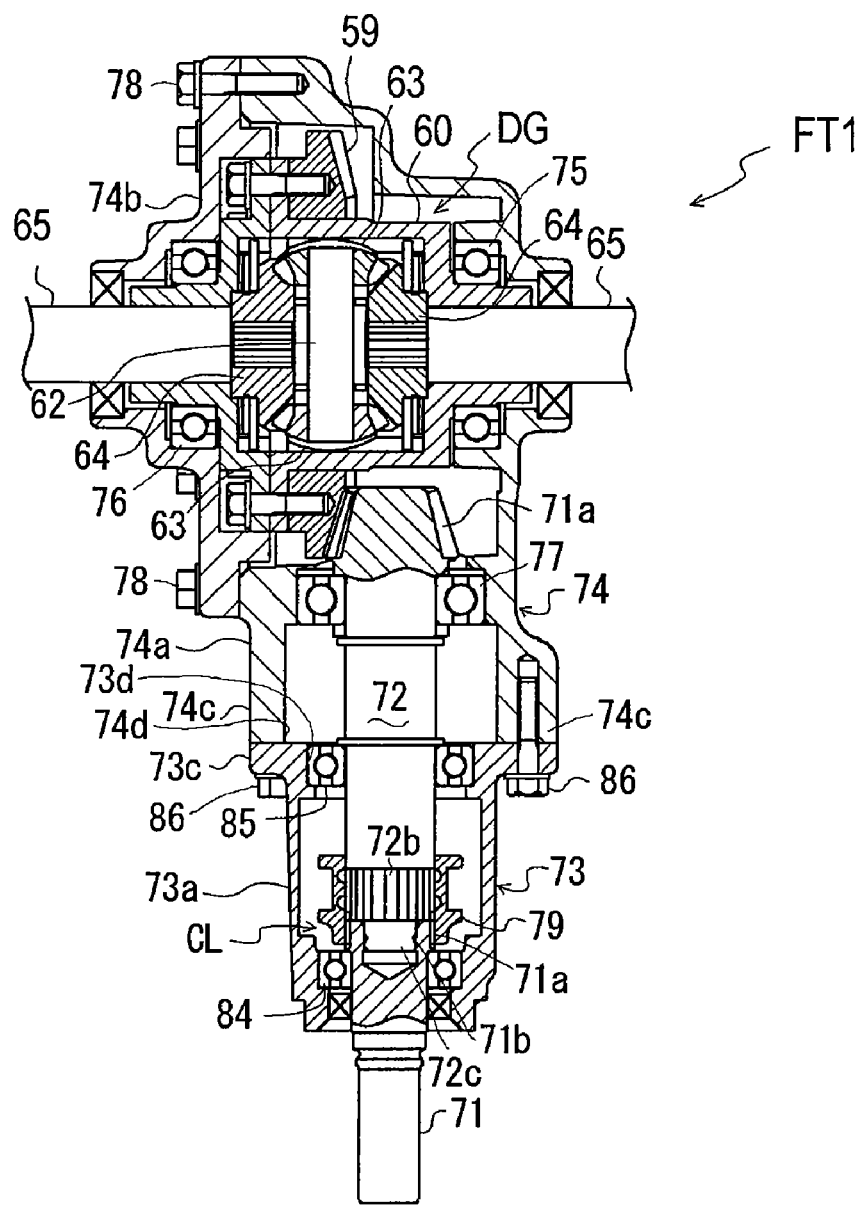
FIG. 13 is a sectional plan view of front transaxle FT1 shown in FIG. 10.
Figure 14:
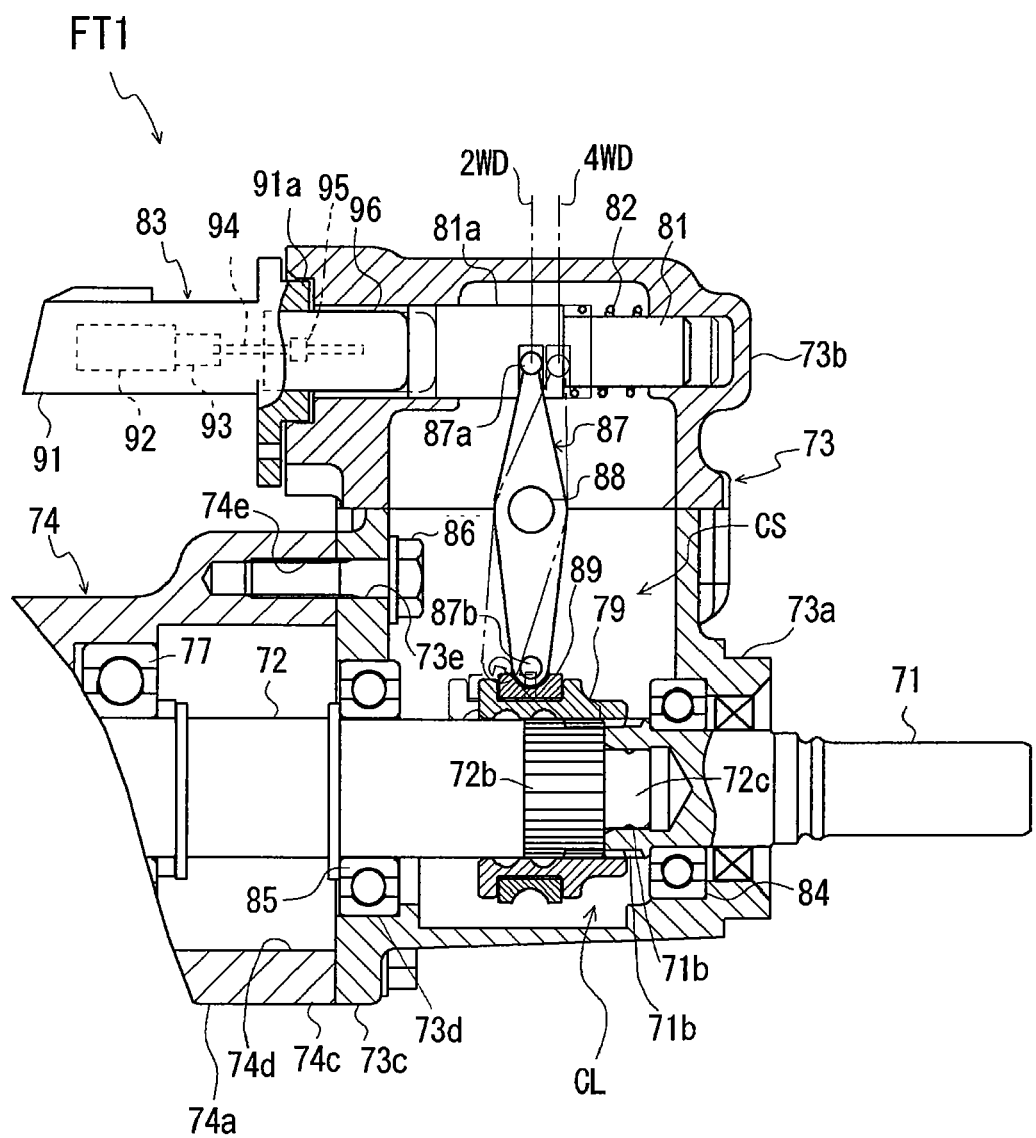
FIG. 14 is a sectional left side view of front transaxle FT1 shown in FIG. 10.

Description will be given of a structure of alternative front transaxle FT1 shown in FIGS. 9-19. Referring to differential gear device DG in front transaxle FT1, as shown in FIGS. 9, 13 and 14, differential casing 60 is journalled in a later-discussed differential chamber casing 74 (or 174) so as to be rotatable integrally with bevel bull gear 59. In differential casing 60, a pivot shaft 62 is provided so as to be rotatable integral with differential casing 60, and bevel differential pinions 63 are pivoted on pivot shaft 62. Axles 65 are inserted at proximal end portions thereof into differential casing 60 rotatably relative to differential casing 60. A pair of right and left differential side gears 64 are fixed on the proximal ends of respective right and left axles 65, and each of differential side gears 64 meshes with differential pinions 63, so that the rotation of differential casing 60 integral with bevel bull gear 59 is differentially distributed between right and left axles 65. The above-mentioned structure of differential gear device DG is similar to that of differential gear device DG in front transaxle FT shown in FIG. 1 excluding that differential gear device DG in front transaxle FT is a limited slip differential gear device provided with friction discs 61 (61a, 61b) as mentioned above.

As a feature of front transaxle FT1 different from front transaxle FT, front transaxle FT1 is provided with a clutch CL for selecting either a four-wheel drive mode of vehicle 80 for driving all front and rear wheels FW and RW or a two-wheel drive mode of vehicle 80 for driving only rear wheels RW. In this regard, as shown in FIGS. 9, 13 and 14, front transaxle FT1 includes a later-discussed clutch chamber casing 73 (or 173) journaling a clutch input shaft 71 and a clutch output shaft 72, which correspond to front transaxle input shaft 57 of front transaxle FT. Clutch input shaft 71 projects rearwardly outward from a rear end of clutch chamber casing 73 so as to be connected at a rear end thereof to propeller shaft 54 via universal joint 55. Clutch output shaft 72 is extended in the fore-and-aft direction of vehicle 80 and coaxially to clutch input shaft 71, and is formed on a front end thereof with a bevel pinion 72a, which meshes with bevel bull gear 59 so as to correspond to bevel pinion 58 of front transaxle FT. As shown in FIGS. 13 and 14, clutch input shaft 71 is formed in a front end portion thereof with a forwardly opened recess 71b, clutch output shaft 72 is formed with a rearwardly projecting projection 72c, and projection 72c is slidably rotatably fitted into recess 71b, so that clutch input and output shafts 71 and 72 are coaxially connected to each other so as to be rotatable relative to each other.

In clutch chamber casing 73, clutch CL is configured between clutch input and output shaft 71 and 72. To constitute clutch CL, as shown in FIGS. 13 and 14, clutch input shaft 71 is splined on an outer peripheral surface of a front end portion thereof so as to form clutch teeth 71a. A rear end portion of clutch output shaft 72 from which projection 72c projects rearward is splined on an outer peripheral surface thereof so as to form clutch teeth 72b. Clutch teeth 71a and clutch teeth 72b are disposed almost continuously to each other by fitting projection 72c in recess 71b. A clutch slider 79 is provided on clutch output shaft 72, and is constantly spline-fitted onto clutch teeth 72b unrotatably relative to shaft 72 and axially slidably so as to be able to mesh with clutch teeth 71a. When clutch slider 79 is disposed at a four-wheel drive position to mesh with both clutch teeth 71a and 72b for transmitting power from clutch input shaft 71 to clutch output shaft 72, vehicle 80 is set in the four-wheel drive mode. When clutch slider 79 is disposed at a two-wheel drive position to mesh with only clutch teeth 72b for isolating clutch output shaft 72 from rotation of clutch input shaft 71, vehicle 80 is set in the two-wheel drive mode. A detent means may be interposed between clutch slider 79 and clutch output shaft 72 so as to retain clutch slider 79 at either the four-wheel drive position or the two-wheel drive position.

As shown in FIG. 14, a shifter arm 87, a pivot shaft 88 and a shifter shaft 81 are provided in clutch chamber casing 73 so as to serve as a clutch shifter CS for moving clutch slider 79, and an actuator 83 is fitted onto clutch chamber casing 73 so as to move shifter shaft 81. Shifter arm 87 has opposite ends 87a and 87b, and is pivoted at a portion thereof between ends 87a and 87b onto pivot shaft 88 extended perpendicular to clutch input and output shafts 71 and 72. Shifter shaft 81 is axially movably extended parallel to clutch input and output shafts 71 and 72. Shifter arm 87 is pivotally fitted at end 87a onto shifter shaft 81, and is pivotally fitted at end 87b onto a fitting ring 89 fitted into an annular groove of clutch slider 79, so that clutch slider 79 is moved according to axial movement of shifter shaft 81 and opposite to the movement direction of shifter shaft 81 in their axial directions. In FIG. 14, a position of end 87a of shifter arm 87 drawn in solid lines is defined as a four-wheel drive position 4WD corresponding to the four-wheel drive position of clutch slider 79, and a position of end 87a of shifter arm 87 drawn in phantom lines is defined as a two-wheel drive position 2WD corresponding to the two-wheel drive position of clutch slider 79.

Actuator 83 includes an actuator casing 91. Actuator casing 91 is formed at an end thereof with a flange 91a. Actuator casing 91 is cantilevered so as to project forwardly outward from a front end surface of a later-discussed shifter housing member 73b of clutch chamber casing 73 by fitting and fastening flange 91a to the front end wall of shifter housing member 73b by bolts. Actuator casing 91 incorporates an electric motor 92, an accelerator 93 for accelerating an output rotation of electric motor 92, and a screw shaft 94 extended from accelerator 93. Screw shaft 94 is rotated by power, which is outputted by electric motor 92 and is accelerated by accelerator 93. Screw shaft 94 has a portion projecting outward from actuator casing 91 into shifter housing member 73b through flange 91a. A nut 95 is screwed on the projecting portion of screw shaft 94. In shifter housing member 73b, a plunger 96 is disposed around screw shaft 94, and is fixed on nut 95. Plunger 96 is axially movably fitted in a wall of shifter housing member 73b and abuts at a rear end thereof against a front end of shifter shaft 81 extended coaxially to plunger 96. A front portion 81a of shifter shaft 81 having the front end has a large diameter, and a spring 82 is wound around a rear portion of shifter shaft 81, which is diametrically smaller than front portion 81a and is extended rearward from front portion 81a, so that spring 82 is interposed between a step between front portion 81a and the rear portion of shifter shaft 81 and a rear end wall of shifter housing member 73b so as to bias front portion 81a of shifter shaft 81 forward against plunger 96.

Electric motor 92 is a reversible motor. Accelerator 93 is a planetary gear unit, for example. When electric motor 92 is driven, accelerator 93 accelerates the output rotation of electric motor 92 and rotates screw shaft 94. The rotation of screw shaft 94 cannot rotate plunger 96 and nut 95 integrally with screw shaft 94 because of the weight of plunger 96. As a result, screw shaft 94 rotates relative to nut 95 so as to axially move nut 95 along screw shaft 94, thereby axially moving plunger 96 fixed to nut 95. When plunger 96 is thrust rearward, plunger 96 pushes shifter shaft 81 rearward against spring 82 so as to compress spring 82 until the compression of spring 82 reaches its limit so as to locate end 87a of shifter arm 87 at two-wheel drive position 2WD. When plunger 96 is withdrawn forward, shifter shaft 81 is moved forward following plunger 96 by the restoring expansion force of spring 82 until a front end of plunger 96 abuts against flange 91a of actuator casing 91 so as to locate end 87a of shifter arm 87 at four-wheel drive position 4WD.

Figure 20:
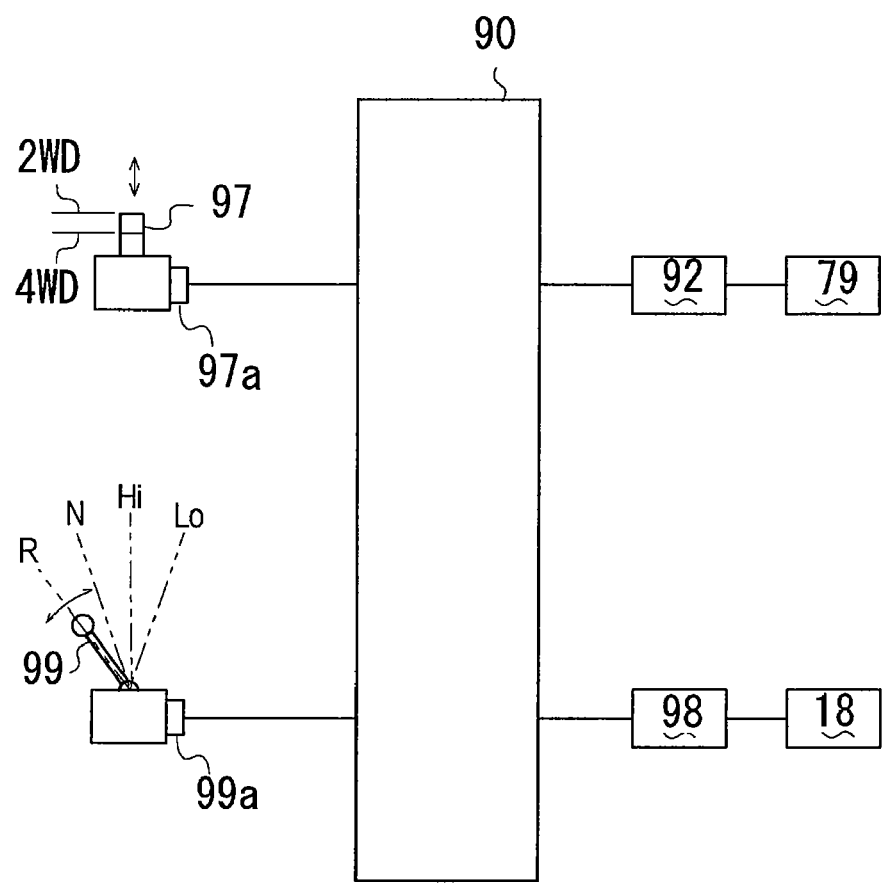
FIG. 20 is block diagram of a vehicle control system for controlling a clutch CL in front transaxle FT1 and for controlling a shifter S in gear transmission GT of power unit PU.

To control motor 92, as shown in FIG. 20, vehicle 80 is provided with a drive mode switch 97 and a controller 90. Drive mode switch 97 is switchable between a depressed position, serving as a four-wheel drive position 4WD corresponding to four-wheel drive position 4WD of end 87a of shifter arm 87, and an undepressed position, serving as a two-wheel drive position 2WD corresponding to two-wheel drive position 2WD of end 87a of shifter arm 87. Drive mode switch 97 is provided with a position sensor 97a for detecting whether switch 97 is disposed at position 4WD or 2WD. Sensor 97a transmits a detection signal to controller 90, and controller 90 commands actuator 83 so as to control electric motor 92 to shift shifter shaft 81, i.e., clutch slider 79 to either the four-wheel drive position or the two-wheel drive position.

Incidentally, referring to FIG. 20, gear transmission GT of power unit PU may be provided with an electrically controlled actuator 98 similar to actuator 83 so as to electrically control shifter S. To control actuator 98, a speed shift lever 99, serving as the speed shift manipulator, is provided in vehicle 80 and is shiftable among a reversing position R, a neutral position N, a high speed position H and a low speed position L, so as to correspond to respective positions R, N, H and L of fork 19 of shifter S. Speed shift lever 99 is provided with a position sensor 99a for detecting a position of lever 99. Controller 90 receives a detection signal from sensor 99a and commands actuator 98 for controlling shifter S, i.e., clutch slider 18.

Referring to FIGS. 9-17, front transaxle FT1 includes differential chamber casing 74 for incorporating differential gear device DG, and includes clutch chamber casing 73 for incorporating clutch CL and clutch shifter CS, and casings 73 and 74 are joined to each other so as to constitute a whole front transaxle casing corresponding to front transaxle casing 56 of front transaxle FT shown in FIG. 1. A clutch housing member 73a and shifter housing member 73b are joined to each other so as to constitute clutch chamber casing 73 formed therein with a clutch chamber for incorporating clutch CL and clutch shifter CS. A main housing member 74a and a side housing member 74b are joined to each other through a vertical joint surface and are fastened to each other by bolts 78 so as to constitute differential chamber casing 74 formed therein with a differential chamber for incorporating differential gear device DG.

Figure 12:
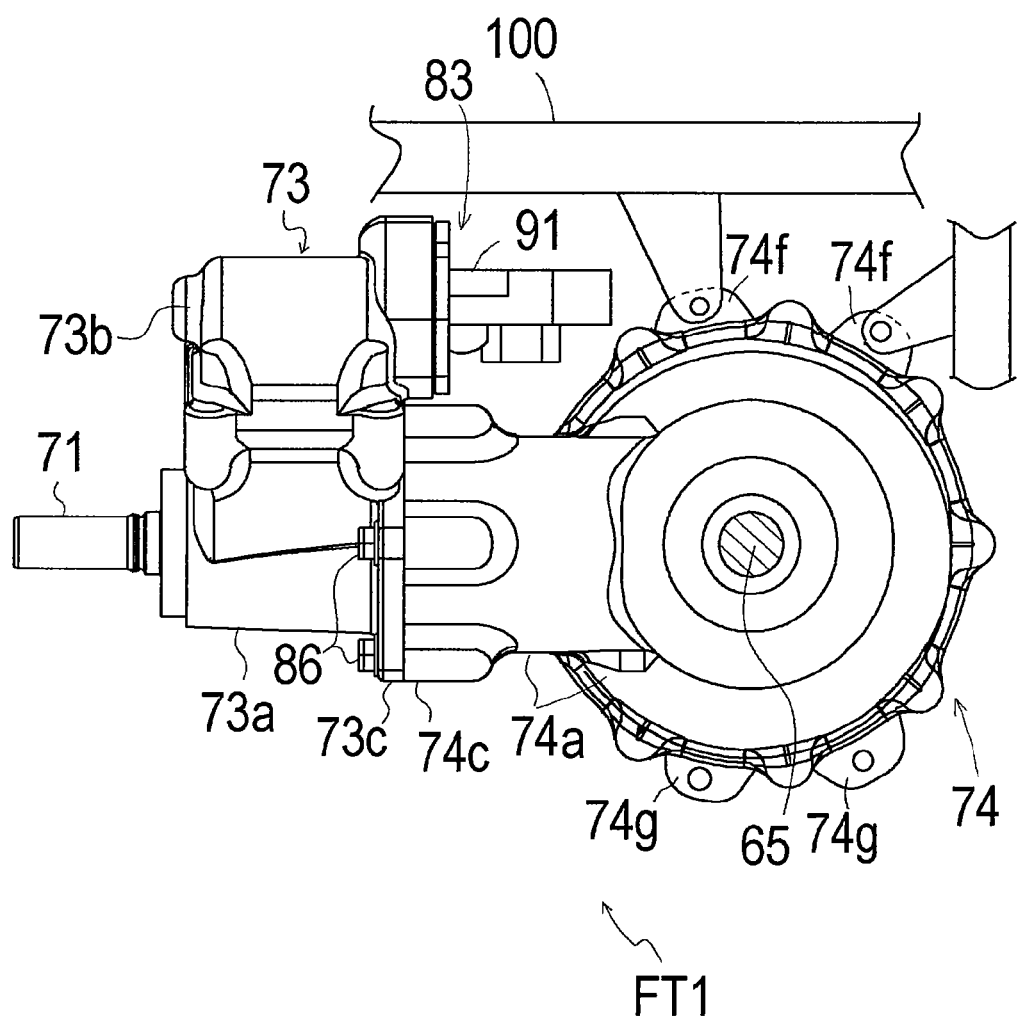
FIG. 12 is a left side view of front transaxle FT1 shown in FIG. 10 when supported by a vehicle body frame 100.

Referring to FIG. 12, differential chamber casing 74 is formed integrally with upper and lower tabs 74f and 74g adapted to be fastened to vehicle body frame 100 by bolts for mounting front transaxle FT1 onto vehicle body frame 100. Tabs 74f and tabs 74g are arranged symmetrically with respect to the center axis of axles 65, i.e., are equidistant from the center axis of axles 65. Tabs 74f and 74g may be formed on either main housing member 74a or side housing member 74b or both housing members 74a and 74b.

In this regard, front transaxle FT1 is mounted onto vehicle body frame 100 so that differential chamber casing 74 selectively has side housing member 74b on either right or left side of main housing member 74a because of a later-discussed reason for selectively locating bevel bull gear 59 rightward or leftward of a center axis of clutch output shaft 72. The center axis of axles 65 must be disposed at a certain position in vehicle 80 regardless of whether side housing member 74b is disposed rightward or leftward of main housing member 74a. When differential chamber casing 74 is arranged to have side housing member 74b leftward of main housing member 74a as shown in FIG. 12, tabs 74f serve as upper tabs to be fastened to vehicle body frame 100 by bolts. If differential chamber casing 74 is arranged to have side housing member 74b rightward of main housing member 74a, tabs 74g serve as upper tabs to be fastened to vehicle body frame 100 by bolts. Due to the equidistant arrangement of tabs 74f and 74g from the center axis of axles 65, the center axis of axles 65 is disposed at the certain position in vehicle 80 regardless of whether differential chamber casing 74 is arranged to have main housing member 74a rightward or leftward of side housing member 74b.

In the differential chamber in differential chamber casing 74 formed by joining main housing member 74a and side housing member 74b to each other, differential gear device DG is disposed so as to have bevel bull gear 59 on differential casing 60 adjacent to side housing member 74a. Main housing member 74a journals one of right and left ends of differential casing 60 and one of right and left axles 65 via a bearing 75 at one of right and left ends of the differential chamber. Side housing member 74b journals the other of right and left ends of differential casing 60 and the other of right and left axles 65 via a bearing 76 at the other of right and left ends of the differential chamber. Main housing member 74a journals clutch output shaft 72 via a bearing 77 at a rear end of the differential chamber. Right and left axles 65 are coaxially extended in the lateral direction of vehicle 80, and clutch output shaft 72 is extended in the fore-and-aft direction of vehicle 80 perpendicular to axles 65.

The end portion of clutch output shaft 72 extended from bearing 77 into the differential chamber is formed thereon with bevel pinion 72a which meshes with bevel bull gear 59. Bevel bull gear 59 adjacent to side housing member 74b is disposed rightward or leftward of the center axis of clutch output shaft 72. The rotation direction of axles 65 depends on whether bevel bull gear 59 is disposed rightward or leftward of the center axis of clutch output shaft 72 in association with the rotation direction of clutch output shaft 72 depending on whether shifter S is set in the forward traveling state (i.e., fork 19 is disposed at high speed position H or low speed position L) or the backward traveling state (i.e., fork 19 is disposed at reversing position R).

For example, in the embodiment shown in FIGS. 10-14, main housing member 74a is disposed rightward of side housing member 74b, so that main housing member 74a journals right axle 65 via bearing 75, side housing member 74b journals left axle 65 via bearing 76, and bevel bull gear 59 meshing with bevel pinion 72a is disposed leftward of the center axis of clutch output shaft 72. In this case, axles 65 are rotated in the forward traveling direction of vehicle 80 when clutch output shaft 72 is rotated clockwise in rear view. Thus, the arrangement of differential chamber casing 74 incorporating differential gear device DG as shown in FIGS. 10-14 is adapted to power unit PU which is designed to rotate transmission output shaft 12 clockwise in rear view when shifter S is set in the forward traveling state.

On the contrary, in the embodiment shown in FIG. 1, bevel bull gear 59 is disposed rightward from the center axis of front transaxle input shaft 57 and meshes with bevel pinion 58 on shaft 57. If differential chamber casing 74 serves as front transaxle casing 56 of front transaxle FT shown in FIG. 1, differential chamber casing 74 must be disposed so as to have side housing member 74b rightward of main housing member 74a. This arrangement of differential chamber casing 74 is adapted to power unit PU which is designed to rotate transmission output shaft 12 counterclockwise in rear view when shifter S is set in the forward traveling state. In this way, whether bevel bull gear 59 is to be disposed rightward or leftward of the center axis of front transaxle input shaft 57 (or clutch input and output shafts 71 and 72) depends on whether transmission output shaft 12 is rotated clockwise or counterclockwise when setting shifter S in the forward or backward traveling state. Whether transmission output shaft 12 is rotated clockwise or counterclockwise when setting shifter S in the forward or backward traveling state depends on whether power unit PU is disposed in vehicle 80 to extend engine output shaft 14 forward or rearward from engine E, i.e., whether power unit PU is disposed to locate belt transmission chamber BC forward or rearward of engine E and gear transmission chamber GC, or on which of opposite directions engine E is designed to rotate in, for example.

As best understood from FIG. 17(b), main housing member 74a of differential chamber casing 74 is formed at a rear end portion with a flange 74c surrounding a rear end opening 74d for passing clutch output shaft 72 therethrough. As shown in FIGS. 13, 14 and others, clutch housing member 73a of clutch chamber casing 73 journals clutch input shaft 71 at a rear end wall thereof via a bearing 84, and journals clutch output shaft 72 at a front end wall thereof via a bearing 85.

Figure 15:
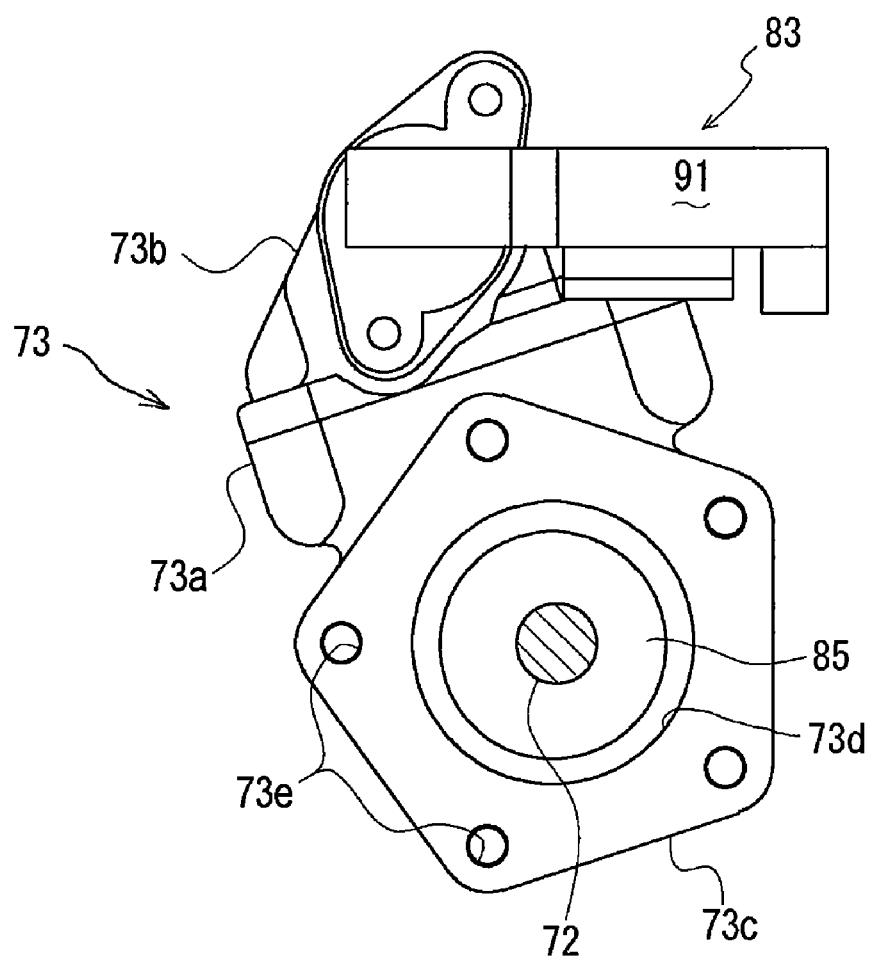
FIG. 15 is a front view of clutch chamber casing 73 for front transaxle FT1 shown in FIG. 10.
Figure 16:
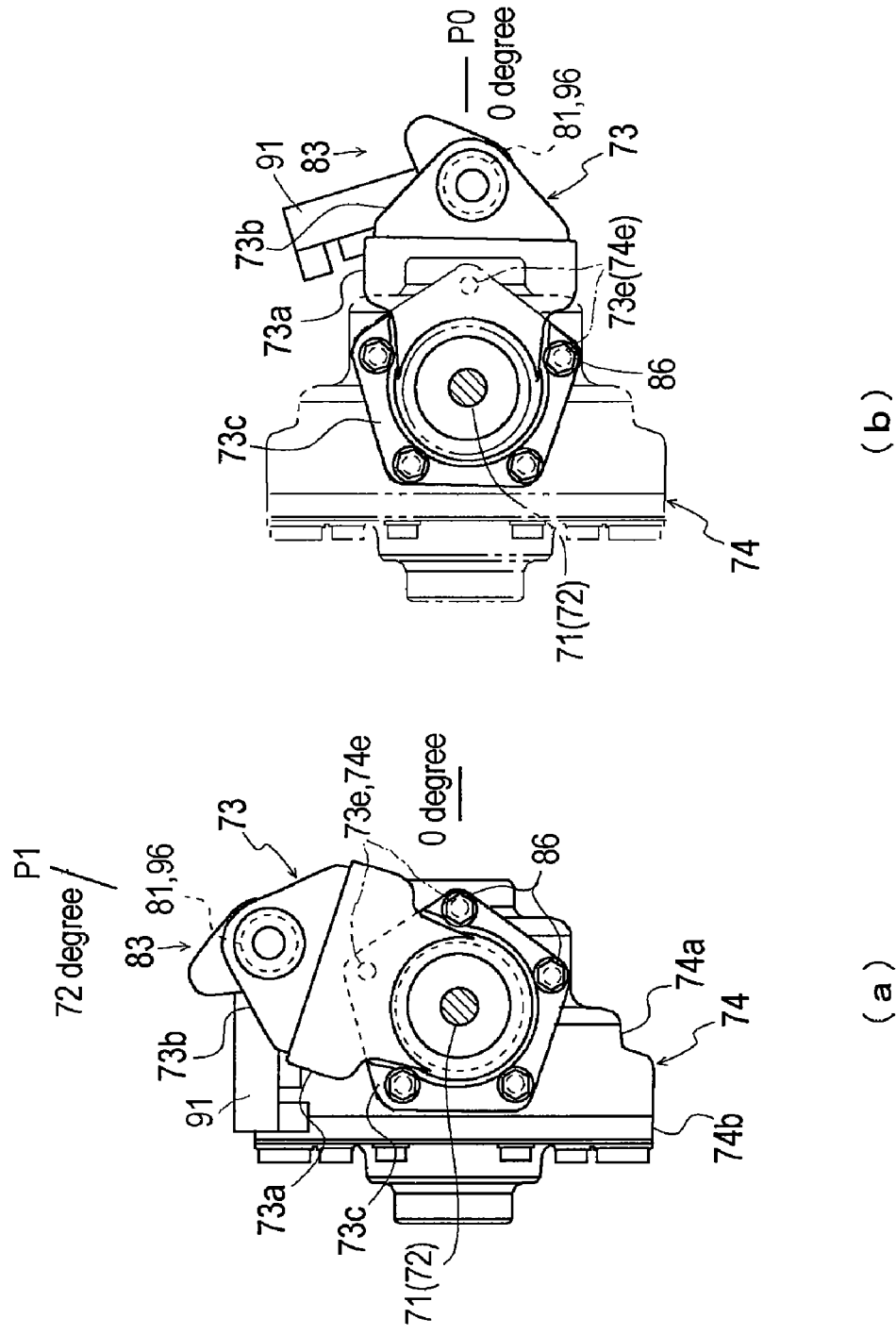
FIGS. 16(a) and 16(b) are rear views of front transaxle FT1 when differential chamber casing 74 is disposed to have a side housing member 74b leftward of a main housing member 74a, FIG. 16(a) illustrates clutch chamber casing 73 joined to differential chamber casing 74 so as to project a shifter housing member 73b and an actuator 83 from a clutch housing member 73a in one direction with respect to a center axis of clutch input and output shafts 71 and 72.
Figure 17:
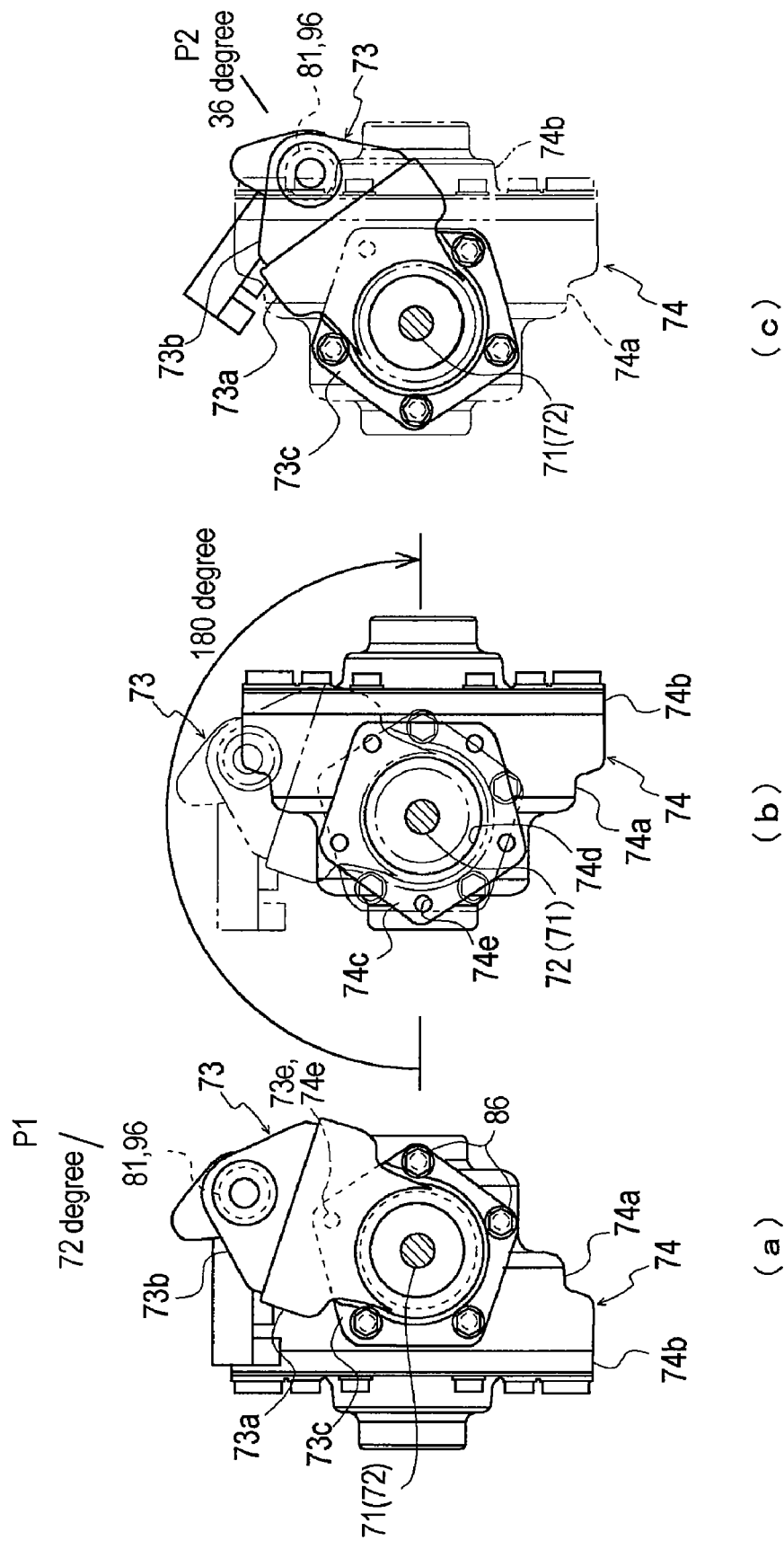
FIG. 17(a) is a rear view of front transaxle FT1 when differential chamber casing 74 is disposed to have side housing member 74b leftward of main housing member 74a, and shifter housing member 73b and actuator 83 project from clutch housing member 73a in the direction of one degree with respect to the center axis of clutch input and output shafts 71 and 72.
FIG. 17(b) is a rear view of differential chamber casing 74 disposed to have side housing member 74b rightward of main housing member 74a after clutch chamber casing 73 is removed from differential chamber casing 74.
FIG. 17(c) is a rear view of clutch chamber casing 73 joined to differential chamber casing 74 disposed to have side housing member 74b rightward of main housing member 74a so as to project shifter housing member 73b and actuator 83 from clutch housing member 73a in another direction with respect to the center axis of clutch input and output shafts 71 and 72.
Figure 18:
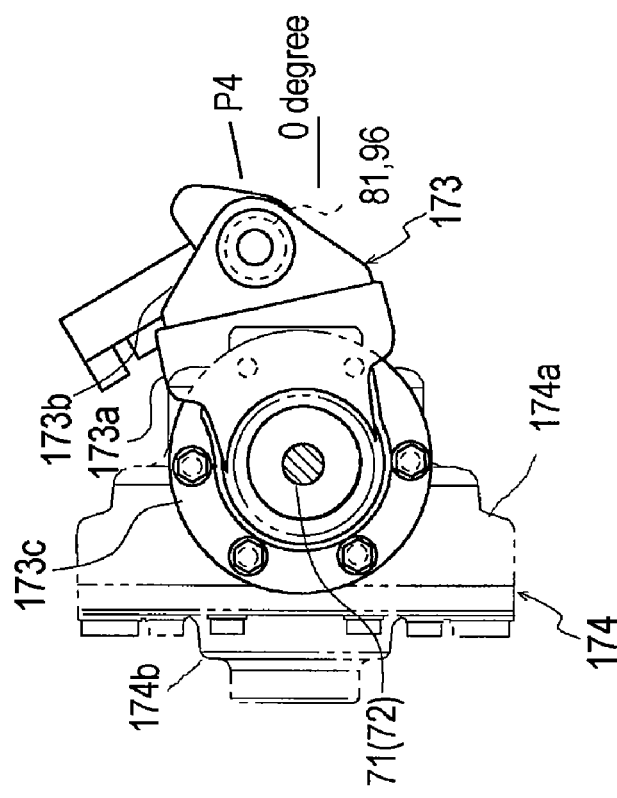
FIGS. 18(a) and 18(b) are rear views of another alternative front transaxle FT1 including a clutch chamber casing 173 formed with a circular flange 173c and differential chamber casing 174 formed with a circular flange 174c, when differential chamber casing 174 is disposed to have a side housing member 174b leftward of a main housing member 174a, FIG. 18(a) illustrates clutch chamber casing 173 joined to differential chamber casing 74 so as to project a shifter housing member 173b and actuator 83 from a clutch housing member 173a in one direction with respect to the center axis of clutch input and output shafts 71 and 72.
Figure 18:
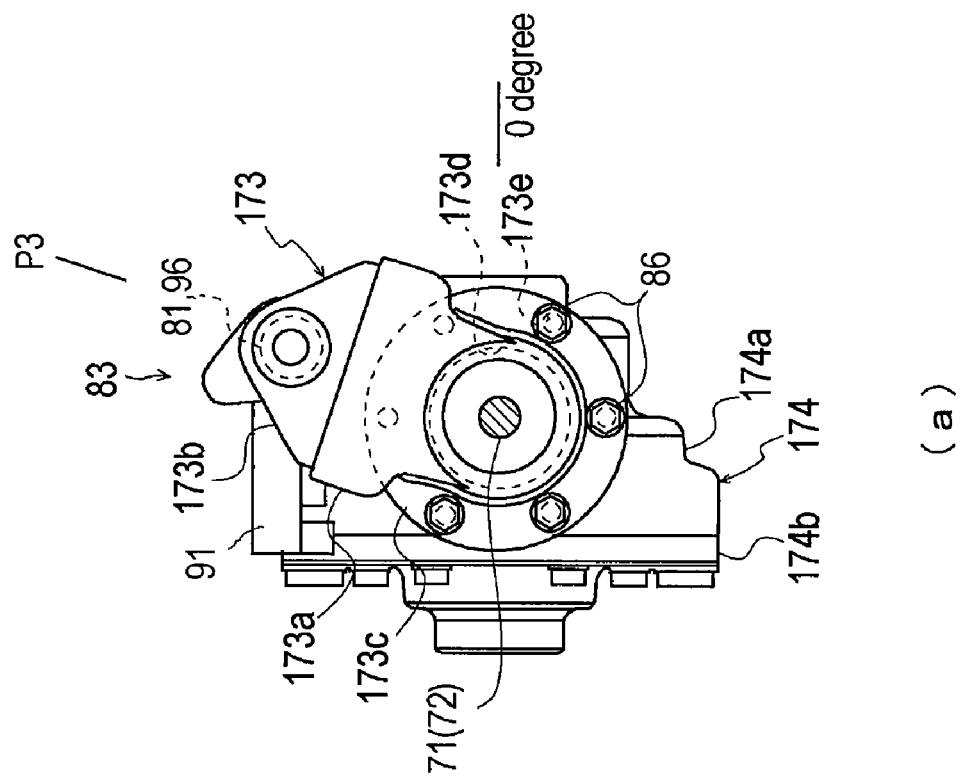
Figure 19:
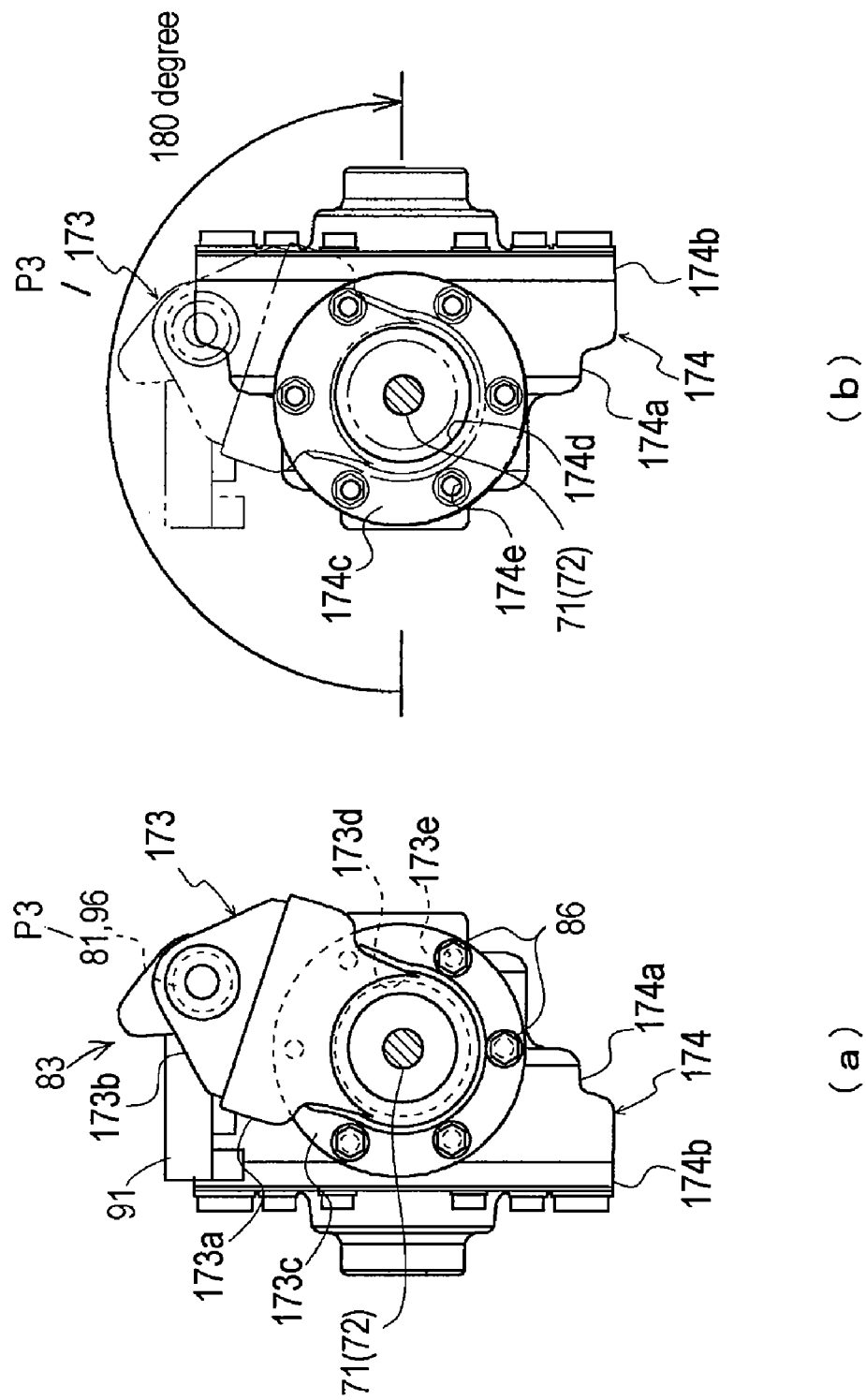
FIG. 19(a) is a rear view of front transaxle FT1 including clutch chamber casing 173 and differential chamber casing 174 when differential chamber casing 174 is disposed to have side housing member 174b leftward of main housing member 174a, and shifter housing member 173b and actuator 83 project from clutch housing member 173a in one direction with respect to the center axis of clutch input and output shafts 71 and 72.
FIG. 19(b) is a rear view of clutch chamber casing 173 joined to differential chamber casing 174 disposed to have side housing member 174b rightward of main housing member 174a so as to project shifter housing member 173b and actuator 83 from clutch housing member 173a in the same direction as that of shifter housing member 173b and actuator 83 shown in FIG. 19(a).

Clutch housing member 73a of clutch chamber casing 73 is formed with a flange 73c at the front wall portion thereof surrounding a front end opening 73d in which bearing 85 is fitted. As shown in FIG. 15 and others, when viewed in the axial direction of clutch input and output shafts 71 and 72, i.e., when viewed in front and rear, openings 73d and 74d are circular, and flanges 73c and 74c surrounding respective openings 73d and 74d are regular-pentagonal shaped so as to match with each other, so that flange 73c has five corners and five bolt holes 73e at the respective corners, and flange 74c also has five corners and five bolt holes 74e.

Flange 73c is fitted to flange 74c so as to coincide bolt holes 73e to respective bolt holes 74e, and five bolts 86 are screwed into respective coinciding bolt holes 73e and 74e, thereby fastening clutch chamber casing 73 to differential chamber casing 74. After clutch chamber casing 73 is fastened to differential chamber casing 74, shifter housing member 73b having actuator 83 mounted thereon projects radially from clutch housing member 73a in rear view. The projection direction of shifter housing member 73b and actuator 83 from clutch housing member 73a can be selected to correspond to other parts of vehicle 80 surrounding front transaxle FT1 or for another reason. This selection of projection direction depends on selection of which of bolt holes 74e of flange 74c coincides to each bolt hole 73e of flange 73c, and depends on whether differential chamber casing 74 is disposed so as to have side housing member 74b rightward or leftward of main housing member 74a.

More specifically, referring to FIGS. 16(a) and 16(b) and FIGS. 17(a), 17(b) and 17(c), in clutch chamber casing 73, one of the five corners (i.e., one bolt hole 73e) is disposed on a phantom line extended between the center axis of clutch input shaft 71 (and clutch output shaft 72) and the center axis of shifter shaft 81 and plunger 96 when viewed in rear. This corner or bolt hole 73e is referred to as a basic corner or basic bolt hole 73e. The selection of projection direction of shifter housing member 73b and actuator 83 means which corner and bolt hole 74e of flange 74c coincide to the basic corner and basic bolt hole 73e of flange 73c and whether differential chamber casing 74 is disposed so as to have side housing member 74b rightward or leftward of main housing member 74a.

Referring to FIGS. 16(a) and 16(b), on an assumption that differential chamber casing 74 is supported onto vehicle body frame 100 so as to locate side housing member 74b leftward of main housing member 74a, flange 74c is disposed to have one edge extended vertically at the left end thereof adjacent to side housing member 74b and to have one corner at the right end thereof opposite to the vertical left end edge with respect to the center axis of clutch output shaft 72, when viewed in rear. This right end corner of flange 74c is assumed to be disposed at 0 degree with respect to the center axis of clutch output shaft 72. On this assumption, the five corners, i.e., five bolt holes 74e, of flange 74c are disposed at respective positions of 0, 72, 144, 216 and 288 degrees (when rounded counterclockwise) with respect to the center axis of clutch output shaft 72.

Therefore, on the assumption that differential chamber casing 74 is held to have side housing member 74b leftward of main housing member 74a, the projection direction of shifter housing member 73b and actuator 83, i.e., the position of the center axis of shifter shaft 81 and plunger 96 can be selected among 0, 72, 144, 216 and 288 degrees (when rounded counterclockwise) with respect to the center axis of clutch input and output shafts 71 and 72 depending on which of the corners (i.e., bolt holes 74e) of flange 74c coincides to the basic corner (i.e., basic bolt hole 73e) of flange 73c. Referring to FIG. 16(a), flange 73c is joined to flange 74c so that the basic corner of flange 73c coincides to the corner of flange 74c at 72 degrees with respect to the center axis of clutch output shaft 72, so that the center axis of shifter shaft 81 and plunger 96 is selectively disposed at 72 degrees with respect to the center axis of clutch input and output shafts 71 and 72, thereby projecting shifter housing member 73b and actuator 83 from clutch housing member 73a in a direction P1 of 72 degrees with respect to the center axis of clutch input and output shafts 71 and 72. Referring to FIG. 16(b), flange 73c is joined to flange 74c so that the basic corner of flange 73c coincides to the right end corner of flange 74c so as to locate the center axis of shifter shaft 81 and plunger 96 horizontally rightward from the center axis of clutch input shaft 71, i.e., at 0 degree with respect to the center axis of clutch input shaft 71, thereby projecting shifter housing member 73b and actuator 83 from clutch housing member 73a in a direction P0 of 0 degree with respect to the center axis of clutch input and output shafts 71 and 72.

A shape of an upper half of flange 74c and a shape of a lower half of flange 74c, i.e., arrangement of bolt holes 74e in the upper half of flange 74c and arrangement of bolt holes 74e in the lower half of flange 74c, are symmetric with respect to a horizontal line passing the center axis of clutch output shaft 72, however, a shape of a right half of flange 74c and a shape of a left half of flange 74c, i.e., arrangement of bolt holes 74e in the right half of flange 74c and arrangement of bolt holes 74e in the left half of flange 74c, are asymmetric with respect to a vertical line passing the center axis of clutch output shaft 72.

In this regard, referring to FIG. 17(a), differential chamber casing 74 is disposed to have side housing member 74b leftward of main housing member 74a, and clutch chamber casing 73 is fixed to differential chamber casing 74 so that the basic corner (or basic bolt hole 73e) of flange 73c defining the position of the center axis of shifter shaft 81 and plunger 96, i.e., the projection direction of shifter housing member 73b and actuator 83 from clutch housing member 73a, is disposed in direction P1 of 72 degrees with respect to the center axis of clutch input and output shafts 71 and 72.

If differential chamber casing 74 comes to need to have side housing member 74b rightward of main housing member 74a so as to correspond to change of design or arrangement of power unit PU or for another reason, referring to FIG. 17(b), clutch chamber casing 73 is removed from differential chamber casing 74 by separating flange 73c from flange 74c, and then, differential chamber casing 74 is vertically reversed, i.e., is rotated 180 degrees with respect to the center axis of clutch output shaft 72. As a result, on the assumption that the horizontal rightward direction from the center axis of clutch input and output shafts 71 and 72 is regarded as 0 degree with respect to the center axis of clutch input and output shafts 71 and 72 as mentioned above, the five corners, i.e., five bolt holes 74e, of flange 74 are disposed at 36, 108, 180, 252 and 324 degrees with respect to the center axis of clutch output shaft 72.

Afterward, clutch chamber casing 73 is fixed to differential chamber casing 74 by fastening flange 73c to flange 74c, however, the basic corner of flange 73c cannot be disposed at 72 degrees with respect to the center axis of clutch input and output shafts 71 and 72 because no corner (i.e., no bolt hole 74e) of flange 74c exists at 72 degrees with respect to the center axis of clutch output shaft 72. Thus, referring to FIG. 17(c), flange 73c is disposed so as to coincide the basic corner thereof to the corner of flange 74c at 36 degrees with respect to the center axis of clutch input and output shafts 71 and 72 as the nearest position to the position of 72 degrees, and is fastened to flange 74c so that shifter housing member 73b and actuator 83 project from clutch housing member 73a in the direction of 36 degrees with respect to the center axis of clutch input and output shafts 71 and 72, i.e., the center axis of shifter shaft 81 and plunger 96 is disposed in a direction P2 of 36 degrees with respect to the center axis of clutch input and output shafts 71 and 72.

Referring to FIGS. 18(a), 18(b), 19(a) and 19(b), an alternative clutch chamber casing 173 and an alternative differential chamber casing 174 are joined to each other so as to constitute a whole front transaxle casing of front transaxle FT1. A main housing member 174a and a side housing member 174b are joined to each other so as to correspond to housing members 74a and 74b, thereby constituting differential chamber casing 174 in which differential gear device DG is arranged in the same way of differential gear device DG in differential chamber casing 74. A clutch housing member 173a and a shifter housing member 173b are joined to each other so as to correspond to housing members 73a and 73b, thereby constituting clutch chamber casing 173 in which clutch input and output shafts 71 and 72, clutch CL, clutch shifter CS, and actuator 83 are arranged in the same way of those in clutch chamber casing 73. Further, actuator 83 projects outward from shifter housing member 173b in the same way of actuator 83 from shifter housing member 73b.

Main housing member 174a of differential chamber casing 174 is formed with a flange 174c surrounding a rear end opening 174d so as to correspond to flange 74c of differential chamber casing 74 surrounding rear end opening 74d. Clutch housing member 173a of clutch chamber casing 173 is formed with a flange 173c surrounding a front end opening 173d so as to correspond to flange 73c of differential chamber casing 73 surrounding front end opening 73d. The only different feature of casings 173 and 174 from casings 73 and 74 is that when viewed in the axial direction of clutch input and output shafts 71 and 72, flanges 173c and 174c are circular, six bolt holes 173e are formed in flange 173c at regular intervals, and six bolt holes 174e are formed in flange 174c at regular intervals so as to correspond to respective bolt holes 173e. Therefore, six bolts 86 are screwed into respective mutually coinciding bolt holes 173e and 174e to fasten flange 173 to flange 174, thereby fixing clutch chamber casing 173 to differential chamber casing 174.

Two of bolt holes 173e overlap shifter housing member 173b projecting from clutch housing member 173a when viewed in rear. These two bolt holes 173e are referred to as basic bolt holes 173e. The selection of projection direction of shifter housing member 173b and actuator 83 from clutch housing member 173a means which bolt holes 174e of flange 174c coincide to basic bolt holes 173e of flange 173c.

Referring to FIGS. 18(a) and 18(b), on an assumption that differential chamber casing 174 is supported onto vehicle body frame 100 so as to locate side housing member 174b leftward of main housing member 174a, and the horizontal rightward direction from the center axis of clutch output shaft 72 when viewed in rear is regarded as 0 degree with respect to the center axis of clutch output shaft 72, flange 174c is disposed to locate bolt holes 174e at respective positions of 30, 90, 150, 210, 270 and 330 degrees (when rounded counterclockwise) with respect to the center axis of clutch output shaft 72.

Therefore, on the assumption that differential chamber casing 174 is held to have side housing member 174b leftward of main housing member 174a, the projection direction of shifter housing member 173b and actuator 83, i.e., the position of the center axis of shifter shaft 81 and plunger 96 can be selected among six radial directions from the center axis of shafts 71 and 72, i.e., six positions, depending on which bolt holes 174e in flange 174c coincide to basic bolt holes 173e in flange 173c. Referring to FIG. 18(a), flange 173c is joined to flange 174c so that basic bolt holes 173e coincide to bolt holes 174e at 30 and 90 degrees with respect to the center axis of clutch output shaft 72, thereby projecting shifter housing member 173b and actuator 83 in a direction P3 rather vertically rightward and upward slantwise when viewed in rear. Referring to FIG. 18(b), flange 173c is joined to flange 174c so that basic bolt holes 173e coincide to bolt holes 174e at 30 and 330 degrees with respect to the center axis of clutch output shaft 72, thereby projecting shifter housing member 173b and actuator 83 in a direction P4 rather horizontally rightward and upward slantwise when viewed in rear.

Arrangement of six bolt holes 174e in flange 174 is point-symmetric with respect to the center axis of clutch output shaft 72 when viewed in rear. Further, three bolt holes 174e in an upper half of flange 174e and three bolt holes 174e in a lower half of flange 174e are arranged symmetrically with respect to a horizontal line passing the center axis of clutch input output shaft 72, and three bolt holes 174e in a right half of flange 174e and three bolt holes 174e in a left half of flange 174c are arranged symmetrically with respect to a vertical line passing the center axis of clutch input output shaft 72. Thus, even if differential chamber casing 174 is disposed so as to have side housing member 174b rightward of main housing member 174a, six bolt holes 174e in rear view are still disposed at respective positions of 30, 90, 150, 210, 270 and 330 degrees (when rounded counterclockwise) with respect to the center axis of clutch output shaft 72, which are the same positions of bolt holes 174e in flange 174c when differential chamber casing 174 is disposed so as to have side housing member 174b leftward of main housing member 174a.

In this regard, referring to FIG. 19(a), differential chamber casing 174 is disposed to have side housing member 174b leftward of main housing member 174a, and clutch chamber casing 173 is fixed to differential chamber casing 174 so that basic bolt holes 173e of flange 173c are disposed at 30 and 90 degrees with respect to the center axis of clutch input and output shafts 71 and 72, thereby projecting shifter housing member 173b and actuator 83 in foregoing direction P3.

If differential chamber casing 174 comes to need to have side housing member 174b rightward of main housing member 174a, referring to FIG. 19(b), clutch chamber casing 174 is removed from differential chamber casing 174 by separating flange 173c from flange 174c, and then, differential chamber casing 174 is vertically reversed, i.e., is rotated in 180 degree with respect to the center axis of clutch output shaft 72. As a result, six bolt holes 174e are still disposed at 30, 90, 150, 210, 270 and 330 degrees with respect to the center axis of clutch output shaft 72. Then, clutch chamber casing 173 is fixed to differential chamber casing 174 by fastening flange 173c to flange 174c, so that basic bolt holes 173e coincide to bolt holes 174e at 30 and 90 degrees with respect to the center axis of clutch output shaft 72. Therefore, shifter housing member 173b and actuator 83 can project from clutch housing member 173a in the same direction P3 as those when differential chamber casing 174 is disposed to have side housing member 174b leftward of main housing member 174a.

In this way, clutch chamber casing 173 and differential chamber casing 174 are formed with flanges 173c and 174c having bolt holes 173e and 174e, respectively, so that shifter housing member 173b and actuator 83 can project from clutch housing member 173a in one desired direction regardless of whether differential chamber casing 174 is disposed to have side housing member 174b rightward or leftward of main housing member 174a.

Figure 21:
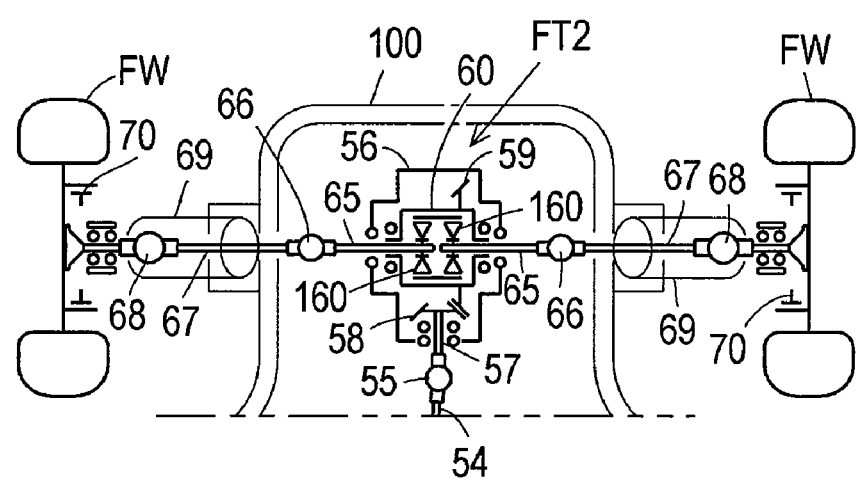
FIG. 21 is a skeleton diagram as a schematic sectional plan view of an alternative front transaxle FT2.

Referring to FIG. 21, an alternative front transaxle FT2 includes front transaxle casing 56, which journals right and left axles 65 and front transaxle input shaft 57 and incorporates bevel pinion 58 fixed (or formed) on shaft 57, differential casing 60 provided around proximal end portions of axles 65, and bevel bull gear 59 fixed on differential casing 60.

In differential casing 60, right and left clutches 160 are interposed between differential casing 60 and respective right and left axles 65. As far as rear wheels RW are normally rotated by the output power from power unit PU, each of clutches 160 is disengaged so as to allow front wheels FW to rotate freely from the power outputted from transmission output shaft 12 and inputted to differential casing 60. Incidentally, differential casing 60 allows differential rotation of right and left axles 65 when clutches 160 are disengaged. In this way, vehicle 80 normally travels with the same feeling as the efficient two-wheel drive traveling.

When vehicle 80 is stuck, the rotary speed of front wheels FW is reduced relative to the rotary speed of differential casing 60 receiving power from transmission output shaft 12 of power unit PU, whereby clutches 160 are engaged to transmit the power from differential casing 60 to axles 65 and to differentially lock axles 65 to each other, thereby transmitting effective power to slipping wheel FW or RW for escaping vehicle 80 from being stuck. In this way, vehicle 80 can emergently travel with the same feeling as the four-wheel drive traveling by engaging clutches 160. Further, clutches 160 are bi-directive clutches so as to be effective during either forward traveling of vehicle 80 or backward traveling of vehicle 80.

Figure 22:
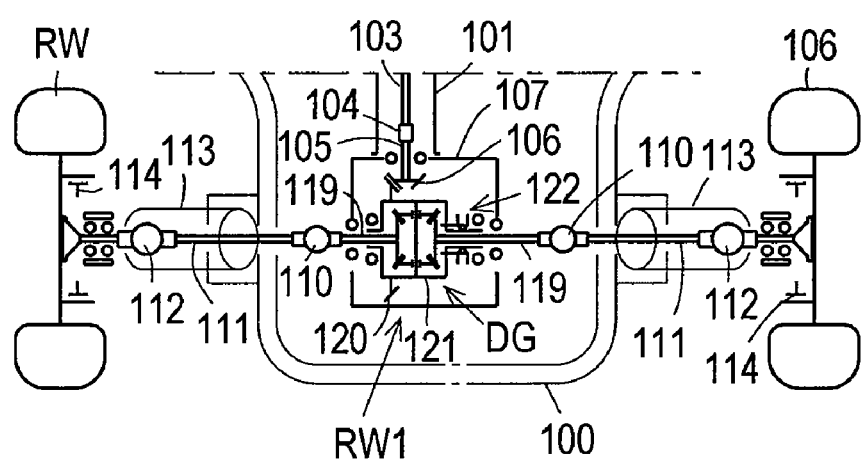
FIG. 22 is a skeleton diagram as a schematic sectional plan view of an alternative rear transaxle RT1.

Referring to FIG. 22, an alternative rear transaxle RT1 includes rear transaxle casing 107 journals a pair of right and left axles 119 and incorporates a differential gear device DG. Axles 119 are drivingly connected to respective right and left rear wheels RW via driving connection components similar to those shown in FIG. 1. Differential gear device DG of rear transaxle RT1 includes a differential casing 121. A bevel bull gear 120 is fixed on differential casing 121 so as to serve as the input of differential gear device DG, and meshes with bevel pinion 106 on rear transaxle input shaft 105. Differential casing 121 incorporates a differential bevel gear mechanism interposed between differential casing 121 and respective axles 119, similar to that in differential casing 60 of differential gear device DG in each of front transaxles FT and FT1.

A manually or automatically controlled differential lock device 122 is provided on one of axles 119 so as to be shiftable between a differential state and differential-locking state. Differential lock device 122 is normally set in the differential state, and is shifted to the differential-locking state at needs so as to lock the axle 119 to differential casing 121, thereby differentially locking right and left axles 119 to each other.

It is further understood by those skilled in the art that the foregoing description is given as preferred embodiments of the disclosed apparatuses and vehicles and that various changes and modifications may be made in the invention without departing from the scope thereof defined by the following claims.

What is claimed is:
1. A power unit comprising:
an engine including an engine output shaft;
a belt transmission driven by the engine;
a belt transmission chamber incorporating the belt transmission;

a second transmission including a transmission input shaft driven by the belt transmission and a transmission output shaft driven by the transmission input shaft;

a second transmission chamber incorporating the second transmission; and a housing member constituting both a part of the belt transmission chamber and a part of the second transmission chamber, wherein the belt transmission chamber has first and second sides opposite each other wherein the engine and the second transmission chamber are juxtaposed on the first side of the belt transmission chamber, wherein the housing member includes a partition all between the part of the belt transmission chamber and the part of the second transmission chamber, wherein the belt transmission includes a drive pulley, a driven pulley, and a belt looped over the drive and driven pulleys, wherein the belt has first and second portions extended between the drive and driven pulleys, the first portion running from the drive pulley to the driven pulley, and the second portion running from the driven pulley to the drive pulley, wherein the engine output shaft serves as a drivel pulley shaft of the drive pulley, wherein the transmission input shaft is extended into the belt transmission chamber through the partition wall of the housing member so as to serve as a driven pulley shaft of the driven pulley, and wherein the transmission output shaft is extended through the partition wall of the housing member and is disposed between the drive and driven pulleys and between the first and second portions of the belt so as to extend through the belt transmission chamber and outward from the belt transmission chamber on the second side of the belt transmission chamber.

2. The power unit according to claim 1, wherein the engine is attached to the housing member so as to drivingly connect the engine output shaft to the drive pulley of the belt transmission in the belt transmission chamber.

3. The power unit according to claim 1, wherein the transmission input shaft and the transmission output shaft are provided thereon with respective fluid-seals in the partition wall of the housing member.

4. The power unit according to claim 1, further comprising:
a belt transmission casing joined to the housing member so as to constitute the belt transmission chamber, wherein the transmission output shaft penetrates the belt transmission casing so as to be extended outward from the belt transmission chamber on the second side of the belt transmission chamber.

5. The power unit according to claim 4, wherein the transmission output shaft is provided thereon with a fluid-seal in a wall of the belt transmission casing.

6. The power unit according to claim 4, wherein a portion of the transmission output shaft penetrating the belt transmission casing is separable from a portion of the transmission output shaft supported by the housing member in the belt transmission chamber.

* * * * *

UNITED STATES PATENT AND TRADEMARK OFFICE
CERTIFICATE OF CORRECTION

PATENT NO. : 8,337,346 B2
APPLICATION NO. : 12/616407
DATED : December 25, 2012
INVENTOR(S) : Kochidomari et al.

It is certified that error appears in the above-identified patent and that said Letters Patent is hereby corrected as shown below:

Column 25, line 10: "sides opposite each other" should be --sides opposite each other,--

Column 25, line 14: "includes a partition all" should be --includes a partition wall--

Column 25, line 26: "serves as a drivel pulley" should be --serves as a drive pulley--

Signed and Sealed this
Second Day of April, 2013

Teresa Stanek Rea
*Acting Director of the United States Patent and Trademark Office*